(12) United States Patent
Kjaer

(10) Patent No.: US 12,480,873 B2
(45) Date of Patent: Nov. 25, 2025

(54) DETERMINING TIME RESPONSE VALUE OF AN ANALYTE IN A LIQUID

(71) Applicant: Radiometer Medical ApS, Brønshøj (DK)

(72) Inventor: Thomas Kjaer, Brønshøj (DK)

(73) Assignee: Radiometer Medical ApS, Brønshøj (DK)

( * ) Notice: Subject to any disclaimer, the term of this patent is extended or adjusted under 35 U.S.C. 154(b) by 146 days.

(21) Appl. No.: 18/258,575

(22) PCT Filed: Dec. 20, 2021

(86) PCT No.: PCT/EP2021/086912
§ 371 (c)(1),
(2) Date: Jun. 21, 2023

(87) PCT Pub. No.: WO2022/136328
PCT Pub. Date: Jun. 30, 2022

(65) Prior Publication Data
US 2024/0044790 A1 Feb. 8, 2024

(30) Foreign Application Priority Data

Dec. 22, 2020 (EP) ..................................... 20216635

(51) Int. Cl.
*G01N 21/55* (2014.01)
*G01N 21/552* (2014.01)
*G01N 21/17* (2006.01)

(52) U.S. Cl.
CPC ... *G01N 21/552* (2013.01); *G01N 2021/1789* (2013.01)

(58) Field of Classification Search
CPC ......... G01N 21/552; G01N 2021/1789; G01N 21/0303; G01N 21/6408; G01N 2021/0346
See application file for complete search history.

(56) References Cited

U.S. PATENT DOCUMENTS

2003/0146109 A1 8/2003 Sailor et al.
2004/0152135 A1* 8/2004 Ghadiri .............. G01N 33/5438
435/7.1
(Continued)

FOREIGN PATENT DOCUMENTS

WO WO 2019/197308 A1 10/2019

OTHER PUBLICATIONS

International Search Report of International Application No. PCT/EP2021/086912, dated Mar. 25, 2022 (3 pages).
(Continued)

*Primary Examiner* — Tony Ko
(74) *Attorney, Agent, or Firm* — Frost Brown Todd LLP

(57) ABSTRACT

There is presented an apparatus for determining one or more time response values of an analyte or a group of analytes (96) in a liquid (99) comprising a translucent element comprising pores (6), wherein the pores (6) are dead end pores (6) extending into the translucent element from respective openings (7) in the translucent element, wherein a cross-sectional dimension of the openings (7) of the pores (6) is dimensioned so as to prevent larger particles or debris from entering the pores (6), while allowing the analyte or the group of analytes in the liquid (99) to enter the pores (6) via diffusion, one or more light sources (10) being adapted to illuminate at least the pores (6) in the translucent element (2), and a light detector (20) being adapted to at each of multiple points in time receive light (21) emerging from the pores (6) in response to illumination (I I) by the one or more light sources, wherein the light detector is further adapted to generate one or more signals based on the received light, each of the one or more signals being temporally resolved and representative of at least a part of the received light, and wherein the apparatus is further comprising a data processing device comprising a processor configured to determine (Continued)

one or more time response values based on the one or more signals.

25 Claims, 10 Drawing Sheets

(56) References Cited

U.S. PATENT DOCUMENTS

2005/0019956 A1    1/2005   Martin et al.
2011/0118128 A1    5/2011   Tello et al.
2020/0249151 A1    8/2020   Kjaer

OTHER PUBLICATIONS

Written Opinion of the International Search Authority for International Application No. PCT/EP2021/086912 (9 pages).
JP Patent Application No. 2023-538721, Notice of Reasons for Rejection dated Jun. 7, 2024.
JP Patent Application No. 2023-538721, Notification of Reasons for Rejection dated Feb. 12, 2025.

\* cited by examiner

DETERMINING TIME RESPONSE VALUE OF AN ANALYTE IN A LIQUID

This application is a national stage filing under 35 U.S.C. § 371 of International Application No. PCT/EP2021/086912, filed on Dec. 20, 2021, which claims priority to European Patent Application No. 20216635.1, filed on Dec. 22, 2020. The contents of these applications are each incorporated herein by reference in their entirety.

FIELD OF THE INVENTION

The present invention relates to an apparatus for determining one or more time response values of an analyte or a group of analytes in a liquid, and more particularly an apparatus comprising a translucent porous element for determining one or more time response values of an analyte or a group of analytes in a liquid and a corresponding method and computer program.

BACKGROUND OF THE INVENTION

Gaining information about an analyte in a liquid can generally be advantageous for one or more reasons. For example, gaining knowledge about a parameter related to an analyte may provide insight into the analyte, which may be known or unknown. For a liquid comprising one or more unknown analytes it may enable detection, such as including distinguishing one or more analytes from each other, if one or more additional parameters can be determined for the one or more analytes in the liquid.

For certain apparatuses and methods, the possibility of gaining an additional parameter of an analyte in a liquid may in particular be relevant if the information is complementary to the information otherwise provided by the apparatus, in particular if the additional parameter allows distinguishing analytes which would otherwise be indistinguishable based on the one or more parameters provided by the apparatus in the absence of the additional parameter.

Therefore, there is a need for an improved apparatus, method and computer program, and in particular for an improved apparatus, method and computer program for determining an additional parameter.

SUMMARY OF THE INVENTION

An object of the present invention is to provide an improved apparatus, method and computer program and in particular an improved apparatus, method and computer program for determining an additional parameter.

According to a first aspect, the invention provides an apparatus for determining one or more time response values of an analyte or a group of analytes in a liquid, such as in whole blood, such as in a whole blood sample, comprising:
  a translucent element comprising pores, wherein the pores are dead end pores extending into the translucent element from respective openings in the translucent element, wherein a cross-sectional dimension of the openings of the pores is dimensioned so as to prevent larger particles or debris from entering the pores, while allowing the analyte or the group of analytes in the liquid to enter the pores via diffusion,
  one or more light sources being adapted to illuminate at least the pores in the translucent element, and
  a light detector being adapted to at each of multiple points in time receive light emerging from the pores in response to illumination by the one or more light sources,
  wherein the light detector is further adapted to generate one or more signals based on the received light, each of the one or more signals being temporally resolved and representative of at least a part of the received light, and
  wherein the apparatus is further comprising:
  a data processing device comprising a processor configured to:
    determine one or more time response values based on the one or more signals.

A possible advantage of the present invention is that it enables gaining information about the one or more time response values of an analyte or a group of analytes in a liquid, which may in turn be beneficial for deriving information about the diffusing analyte, such as size (e.g., molecular weight and/or extent, such as length or diameter or volume) and/or shape (e.g., spherical or elongated), and/or information about the liquid, such as viscosity and/or temperature.

Another possible advantage might be that it enables distinguishing otherwise indistinguishable analytes or groups of analytes. For example, for optically similar analytes or groups of analytes, it might otherwise be difficult or impossible to distinguish the analytes or groups of analytes, but if they differ in a parameter affecting a diffusion coefficient (e.g., molecular weight, shape and/or extent), then this parameter will affect the diffusion coefficient, which in turn can affect or determine the time response value, which upon being determined hence allows drawing conclusions regarding the (qualitative) presence (such as presence in a concentration above a predetermined absolute or relative threshold) of a certain analyte or group of analytes and possibly furthermore a (quantitative) measure of an absolute or relative concentration of a certain analyte or group of analytes.

The present invention can furthermore be advantageous for offering a possibility of obtaining the one or more time response values of the one or more analytes in the pores of the translucent element, because filtration is or can be performed by diffusion where no external energy is needed. Another possible advantage is that the diffusion is fast so that measurement on the liquid that have diffused into the pores of the translucent element can be performed shortly after (or within a short time after) the liquid has arrived at the porous translucent element, such as has been introduced through a liquid inlet into a measurement chamber comprising the porous translucent element. Another possible advantage is that the apparatus, can be kept simple, with few parts and none that needs moving or changing position during filtration and measurement. Another possible advantage is that the apparatus can be kept small in size and the volume needed for a measurement is very small compared to apparatuses comprising regular filtration devices.

Another possible advantage is that the apparatus enables determining—in addition to the one or more time response values—complimentary information. For example, one or more other modalities, such as other optical measurements, such absorbance measurements and/or spectroscopic measurements, information may be obtained enabling deriving knowledge about concentration and/or type of analyte(s) in the liquid (which—analogously to the preceding comments on distinguishability—might enable distinguishing analytes or groups of analytes having similar or identical time response values).

In general when referring to distinguishability, such as optical distinguishability, it may be understood in the context of the claimed apparatus. For example, two analytes may be considered optically distinguishable in the present context if within (embodiments of) the apparatus according to the invention does not allow to distinguish them optically, e.g., based on absorption, even if other apparatus, e.g., more advanced apparatus (e.g., with higher light intensities and/or better spectral resolution) might in fact allow optically distinguishing the same analytes.

By '(each of the one or more signals being) temporally resolved' may be understood that each of the one or more signals comprise data corresponding to or representative of different points in time, such as different, well-defined points in time, such as each of the one or more signals being obtained at a series of time points or time intervals.

By 'time response value' may be understood a value indicative of, such as quantifying, a time-scale of a transient response of the system comprising the analyte or group of analytes in the liquid.

For example, the time response value may according to embodiments be the 'time constant' as employed in physics and engineering, usually denoted by the Greek letter $\tau$(tau), which is the parameter characterizing the response to a step input of a first-order, linear time-invariant system, such as wherein a rate of change $dC_p/dt$ in analyte concentration $C_p$ in the pores as a function of time t is directly proportional— with constant of proportionality $1/\tau$—with difference $C_p$-$C_0$ between the concentration Cp in the pores and the concentration $C_0$ at the openings of the pores. According to one example, the concentration Cp of analyte in the pores and the concentration of analyte $C_0$ at the openings of the pores are each zero until time t=0 where the concentration $C_0$ of analyte at the openings of the pores instantly (cf., a step-function or a Heaviside function, H(t)) goes to concentration $K_0$, which can be described as:

$$dC_p/dt + \tau^{-1}C_p = K_0 H(t),$$

which has the solution:

$$C_p(t) = K_0(1 - e^{-t/\tau})$$

Thus, the concentration in the pores is zero at time t=0, becomes $K_0(1-e^{-1})$ ($\approx 0.63 K_0$) at t=$\tau$ and approaches $K_0$ for t approaching infinity (t→∞).

According to another example or embodiment, the time response value may be represented by one or more constants in another functional expression.

According to another example or embodiment, the time response value may be represented by a rate of change at a specific point in time, such as for a signal sampled at temporally spaced intervals, the time response value may be a difference between two signal values, such as two neighboring signal values.

However, according to other examples, the time response may take other forms, such as more advanced forms, e.g., including in scenarios, where the diffusion cannot adequately be described by the response to a step input of a first-order, linear time-invariant system. For example, multiple phases (e.g., for cell-free hemoglobin, cfHb, the penetrable plasma phase of a whole blood sample and the impenetrable phase inside the red blood cells of a whole blood sample). Another example could be a signal comprising contributions from both slowly and rapidly diffusing analytes. Alternatively, if—for whatever reasons—an obtained signal is similar or identical to an underdamped step response, the one or more time response values may comprise one or more values representative of one or more of rise time, time to first peak, settling time, and period.

By 'one or more time response values' is understood that several time response values can be determined for an analyte or a group of analytes in liquid. First, for example, multiple wavelengths may be employed, which may each provide one or more time response values, e.g., due to each wavelength yielding a signal representative of a certain analyte (or sub-group of analytes) within a group of analytes. Second, for example, even for a single wavelength, a time response may be the result of several parameters, which entails that the time response can be—or is most accurately—described in terms of a corresponding plurality of several time response values (for example a first time response value indicative of a time response of a rapidly diffusing analyte and a second time response value indicative of a time response of a slowly diffusing analyte).

'Transient response' is understood as is common in the art, such as a response to a change from and/or towards equilibrium (or from a certain configuration towards equilibrium). For example, a change from a situation where a liquid comprising the one or more analytes is placed at the opening of the pores, while the pores comprise only a corresponding liquid without the one or more analytes, in which case a transient response takes place, such as wherein place where the one or more analytes diffuse into the pores until equilibrium occurs.

By 'analyte' is understood any entity, substance or composition, and may in particular be an element, ion and/or molecule. By a 'group of analytes' may optionally be understood a group of analytes sharing one or more properties, such as chemical properties or structure or optical or physical properties.

The term "liquid" refers to any liquid, such as whole blood, the plasma fraction of whole blood, spinal cord liquid, urine, pleura, ascites, wastewater, a pre-prepared liquid for any kind of injection, liquids with a constituent possible to detect by spectroscopy. The liquid may be understood to have a refractive index (such a real part of the refractive index), such as at or about 416 nm or at or about 455 nm, of equal to or below 1.50, such as equal to or below 1.45, such a equal to or below 1.40, such as equal to or below 1.38, such as equal to or below 1.36.

In embodiments, the liquid is a liquid sample. The term "sample" refers to the part of the liquid that is used or needed in the analysis with the apparatus of the invention.

The term "whole blood" refers to blood composed of blood plasma, and cellular components. The plasma represents about 50%-60% of the volume, and cellular components represent about 40%-50% of the volume. The cellular components are erythrocytes (red blood cells), leucocytes (white blood cells), and thrombocytes (platelets). Preferably, the term "whole blood" refers to whole blood of a human subject but may also refer to whole blood of an animal. Erythrocytes constitute about 90%-99% of the total number of all blood cells. They are shaped as biconcave discs of about 7 µm in diameter with a thickness of about 2 µm in an un-deformed state. The erythrocytes are highly flexible, which allows them to pass through very narrow capillaries, reducing their diameter down to about 1.5 µm. One core component of erythrocytes is hemoglobin which binds oxygen for transport to the tissues, then re-leases oxygen and binds carbon dioxide to be delivered to the lungs as waste product. Hemoglobin is responsible for the red color of the erythrocytes and therefore of the blood in total. Leucocytes make up less than about 1% of the total number of all blood cells. They have a diameter of about 6 to about 20 µm. Leucocytes participate in the body's immune system e.g. against bacterial or viral invasion. Thrombocytes are the smallest blood cells with a length of about 2 to about 4 µm and a thickness of about 0.9 to about 1.3 µm. They are cell fragments that contain enzymes and other substances important to clotting. In particular, they form a temporary platelet plug that helps to seal breaks in blood vessels.

The terms "blood plasma" or "plasma" refer to the liquid part of the blood and lymphatic liquid, which makes up about half of the volume of blood (e.g. about 50%-60% by volume). Plasma is devoid of cells. It contains all coagulation factors, in particular fibrinogen and comprises about 90%-95% water, by volume. Plasma components include electrolytes, lipid metabolism substances, markers, e.g. for infections or tumors, enzymes, substrates, proteins and further molecular components.

The term "wastewater" refers to water that has been used, as for washing, flushing, or in a manufacturing process, and so contains waste products and/or particles and is thus not suitable for drinking and food preparation.

By 'determining one or more time response values of an analyte or group of analytes' may be understood both qualitatively detecting if, e.g., a time response value is above/below a certain threshold or within/outside a certain interval (yes/no) and quantitatively determining, e.g., a time response value, such as on an ordinal, interval or ratio type scale.

It may be understood that determining the one or more time response values, and more particularly data acquisition for determining the one or more time response values, relies on 'Optical probing', which is understood as is common in the art, such as irradiating light onto at least a portion of the liquid (such as a portion of the liquid inside the pores) and receiving at least a portion of light, where the received light enables deriving information about analytes (possibly) therein.

In an embodiment, the apparatus may be arranged for automatically determining one or more time response values of an analyte or a group of analytes in a liquid. By 'apparatus for automatically determining one or more time response values of an analyte or a group of analytes in a liquid' may be understood any apparatus capable of automatically—such as without necessitating human intervention subsequent to providing the liquid (sample) to the apparatus—determining the one or more time response values of an analyte or a group of analytes in a liquid an analyte concentration in a liquid, such as in a liquid sample, such as an apparatus capable of probing relevant optical properties of the analyte or group of analytes in the liquid and determining the one or more time response values of an analyte or a group of analytes in a liquid.

The term "translucent" refers to a material's property of allowing light to pass through. The term "transparent" refers to the property of a material of allowing light to pass through the material without being scattered. The term "transparent" is thus considered a sub-set to the term "translucent".

Preferably the membrane, such as the one or more layers, shows a reflectivity (such as at the interface between the translucent element and the one or more layers) of more than 25%, such as more than 30%, such as more than 35%, such as more than 40%, such as more than 50%, such as more than 75%, such as more than 90% or even more than 99% in the spectral range of detection when tested in an integrating sphere, i.e. in the spectral range from which a signal representative of the relevant plasma component is developed, such as in the range from 380 nm to 750 nm, from 400 to 525 nm, or at or about 416 nm or at or about 455 nm, e.g. for normal incidence light.

The technology applied to measure reflectance from an interface or transmittance through an interface or through a length of a (bulk) material (of light possibly being or comprising diffuse light) may be using an Integrating Sphere, such as relying on Fourier Transform Infrared (FTIR) analysis. The light hits the (possibly diffusing) sample (such as interface or a portion of bulk material) such as the interface between the translucent element and the one or more layers at a normal 90° angle to the one or more layers. The reflected and/or transmitted light is scattered when interacting with the sample. The integrating sphere is a device where scattered transmitted and/or reflected light from a diffuse sample is collected, using the highly reflective surface of the sphere wall where the light 'bounces' around until reaching the detector. In this way accurate results from a surface that normally would yield low reflectance or transmittance due to scattering, can be achieved.

By 'translucent (element)' may in general be understood an element comprising a translucent material, such as wherein said material (such as the translucent material and/or the material of the translucent element) has an attenuation coefficient so that an (optionally partially or wholly diffuse) transmission coefficient of light through the material (such as disregarding any interface effects) is at least 50% for a length through the material of 100 micrometers, such as a fraction of light not making it through a length of material is equal to or less than 50% pr. 100 micrometer, such as equal to or less than 40% pr. 100 micrometer, such as equal to or less than 20% pr. 100 micrometer, such as equal to or less than 10% pr. 100 micrometer, such as equal to or less than 5% pr. 100 micrometer, such as at a wavelength at or about 416 nm or at or about 455 nm. An advantage of this may be that it enables getting photons in to and/or out of the translucent element. The wording 'translucent element' may be understood and used interchangeably with 'an element comprising translucent material'. In an embodiment, a transmission coefficient of light through the translucent element, such as from the front side to the back side in a direction orthogonal to the front side and/or the back side, such as disregarding any interface effects, is at least 10%, such as at least 25%, such as at least 50%, such as at least 75%, such as at least 90%, such as at least 95%, such as at least 99%, such as for electromagnetic radiation (or light) with wavelengths, such as at least for one wavelength, within the range from 380 nm to 750 nm, such as from 400 to 520 nm, such as 400-460 nm (or 415-420 nm), such as at or about 415 nm or at or about 416 nm or at or about 450 nm or at or about 455 nm.

The terms 'back side' and 'backside' are used synonymously and interchangeably.

By 'attenuation coefficient' may be understood Napierian attenuation coefficient u, such as wherein transmission T through a material is given as:

$$T=\exp(-\text{int}(u(z)dz),$$

where 'exp' denotes the exponential function, 'int' denotes an integral (through the length of the material), z denotes a corresponding axis through the material and the corresponding coordinate).

The attenuation coefficient may be obtained as is common in the art, such as via measurement in a standard spectrophotometer, which measures the absorption through, e.g., a 1 cm cuvette. The measured absorbance, denoted by A (or Abs), is in a standard apparatus determined as $A=\log(I_0/I)$, where log is the base-10 logarithm, $I_0$ is the intensity before the cuvette and I the intensity after the cuvette. The measured absorbance is thus related to the Napierian attenuation coefficient as $A=\log(e) \text{ int}(u(z)dz$ with $e=2.71828$ denoting the base number for the natural logarithm.

In general, when referring to optical properties (such as translucent, absorbing, internally reflective, reflective) throughout this application, it may generally be understood to be done with reference to electromagnetic radiation (or light) with wavelengths, such as at least for one wavelength, within the range from 380 nm to 750 nm, such as from 400 to 520 nm, such as 400-460 nm (or 415-420 nm), such as at or about 415 nm or at or about 416 nm or at or about 450 nm or at or about 455 nm.

The translucent element has a front side and a backside facing away from the front side, wherein the front side may be adapted for being contacted directly with the liquid (such as no one or more layers being present at a front side of the translucent layer), or separated from the liquid, such as exclusively separated from the liquid, by one or more layers at the front side of the translucent element, the one or more layers being adapted to be non-reflective to light reaching the one or more layers at least at one angle of incidence, such as at least at normal incidence, from the translucent element, be reflective (such as said one or more layers being or comprising a metal and/or a material having an extinction coefficient disqualifying it as translucent), wherein a refractive index of the one or more layers is equal to or higher than a refractive index of the translucent element, and/or allow internal reflection, such as total internal reflection, at an interface, such as an external interface, of light reaching the interface from the translucent element, wherein the dead end pores are extending from respective openings fluidically connecting them with the liquid at the front side into the translucent element (through one or more layers if present).

By 'contacted directly with the liquid' may be understood that the front side surface of the translucent element is a solid-liquid interface, such as wherein no one or more layers separate the translucent element from a volume external to the translucent element, such as the liquid. By 'separated from the liquid by one or more layers at the front side of the translucent element' may be understood that one or more layers, such as thin-film layers (such as a thin film layer being equal to or less than 100 micrometers thick), are present at the solid-liquid interface at the front side of the translucent element. By 'exclusively separated' may be understood that no other layers are separating the translucent element from the liquid.

By 'being adapted to be non-reflective to light reaching the one or more layers at least at one angle of incidence' may be understood that at at least at one angle of incidence (such as normal incidence), little or no light is reflected (such as a reflection coefficient being less than such as less than 0.9, such as less than 0.8, such as less than 0.7, such as less than 0.6, such as less than 0.5, such as less than 0.4, such as less than 0.3, such as less than 0.1, such as less than 0.01) from the one or more layers when incident light (at or about 416 nm or at or about 455 nm) is coming in a direction through the translucent element.

For example, the non-reflectivity can be due to absorption and/or transmission. The at least one angle of incidence can be normal incidence.

According to an embodiment, there is presented a translucent element wherein the front (side) of the translucent element is separated from the liquid, such as exclusively separated from the liquid, by one or more layers at the front side of the translucent element, the one or more layers being adapted to be translucent to light reaching the front side at normal incidence from the translucent element.

According to an embodiment, there is presented a translucent element wherein the front (side) of the translucent element is separated from the liquid, such as exclusively separated from the liquid, by one or more layers at the front side of the translucent element, the one or more layers being adapted to be absorbent to light reaching the front side at normal incidence from the translucent element.

By 'absorbent' may be understood that more than 1%, such as more than 10%, such as more than 25%, such as more than 40%, such as more than 50%, such as more than 60%, such as more than 75%, such as more than 90%, of the incident light (at or about 416 nm or at or about 455 nm) at at least one angle of incidence (such as normal incidence) is neither reflected from the one or more layers back into the translucent element nor transmitted through the one or more layers.

By 'being adapted to be reflective to light reaching the one or more layers at least at one angle of incidence' may be understood that at least at one angle of incidence, light is reflected (such as a reflection coefficient being at least 0.25, such as at least 0.4, such as at least 0.5, such as at least 0.6, such as at least 0.75, such as at least 0.90, 0.95, such as at least 0.99, e.g., at or about 416 nm or at or about 455 nm and/or normal incidence) from the one or more layers when incident light is coming in a direction through the translucent element, wherein a refractive index of the one or more layers is equal to or higher than a refractive index of the translucent element. According to such 'reflective' embodiments, the one or more layers may be or comprise metallic layers (such as a layer comprising, such as consisting of, platinum, palladium, an alloy comprising as a principal component platinum or palladium, silver and/or aluminum) and/or layers having comprising material having an extinction coefficient disqualifying said layers as translucent.

According to an embodiment, there is presented a translucent element wherein the translucent element and/or the one or more layers separating, such as exclusively separating, the front side of the translucent element from the liquid is arranged for enabling internal reflection, such as total internal reflection, at the interface between on one side the translucent element and/or one or more layers and on the other side the liquid.

By 'being adapted to allow internal reflection' is be understood that (internal) reflection is allowed and possible at an interface between media wherein the medium comprising incident and reflected light, such as the medium wherein both incident and reflected light is travelling, is the medium of (relatively) higher refractive index compared to the medium on the opposite side of the interface, which is the medium of (relatively) lower refractive index, such as a reflection coefficient being at least 0.25, such as at least 0.4, such as at least 0.5, such as at least 0.6, such as at least 0.75, such as at least 0.90, 0.95, such as at least 0.99, e.g., at or about 416 nm or at or about 455 nm and/or normal incidence or non-normal incidence, e.g., with 45° angle with respect to normal). In embodiments, the extinction coefficient of both media (i.e., each media on each side of the interface) has an extinction coefficient (or attenuation coefficient) being sufficiently low in order for each material to qualify as translucent.

According to an embodiment, the translucent element is a translucent slab, such as wherein slab is understood to be monolithic.

Each of the small pores has an opening through which it can communicate with a liquid space at the front side of the translucent element. The pores thus penetrate the one or more layers (if present) to allow for liquid communication between the pores and the liquid space. The pores extend from the respective opening at the front side into the translucent element in a direction towards the backside. The pores are "dead end" meaning that the pores end within the translucent element. The pores do not continue all the way through the translucent element to the backside or to any common reservoir or recipient inside the element. The pores are only in liquid communication with the liquid space at the front side of the translucent element. Note that in some embodiments the dead end pores can be crisscrossing and at least some of the pores may thus be connected to each other forming an X-shape, a Y-shape, a V-shape, or similar interconnected shapes. Such a configuration is equally considered as dead end, since the pores are only filled from the front side and no significant net mass transport passing through the pores occurs under operation, even if they cross each other. By appropriately dimensioning the opening of the pores at the front side it is possible to prevent e.g. red blood cells of a whole blood sample or debris in the liquid on the front side of the translucent element from entering the pores, while allowing relevant components in the plasma fraction of the whole blood sample or in the liquid to enter the pores, wherein relevant components are substances present in the plasma fraction of the whole blood sample and that are to be measured/detected using the sensor. In particular, bilirubin and carbon dioxide are relevant components.

Under operation, the front side of the translucent element is contacted with a whole blood sample or a liquid. The small pores in the translucent element communicate with the whole blood sample or liquid through the openings in the front side. The pore openings are dimensioned to selectively extract a sub-sample of the plasma phase of the whole blood sample or to extract a sub-sample of the liquid including the analyte. No red blood cells can enter the pores through the openings on the front side of the translucent element. Nothing larger than the pore diameter can enter the pores which excludes e.g. any debris included in the liquid. As mentioned, the pores are dead end, only communicating with the front side of the translucent element, i.e. the sub-sample is extracted for optical probing inside the pores and after the measurement discharged again through the same openings in the front side of the translucent element. The sub-sample volume corresponds to the total internal volume of the pores. No filtration and net mass transport of any filtrate occurs through the pore containing layer—neither into any common filtrate recipient nor to any filtrate outlet. The optical detection will then be performed only on the sub-sample contained in the pores.

The small sub-sample with a representative content of the relevant components may be transferred to the pores in any suitable manner. The small dead end pores allow for a very efficient and fast extraction of the sub-sample for optical probing from a whole blood sample or a liquid through the openings in the front side by means of capillary forces and/or diffusion.

In a typical operation mode, the front side surface of the translucent element is contacted by a rinsing liquid prior to contacting the front side with a whole blood sample or liquid that is to be analyzed. Thereby, the pores are 'primed' with a prefill of a liquid that is compatible with the whole blood sample or the liquid, and in particular a liquid that is compatible with the plasma phase if the liquid is whole blood, such as an aqueous solution commonly used for rinse, calibration and/or quality control purposes in blood analyzers. Typical rinse liquids used for e.g. wash-out in whole blood analyzer systems may be used as such a liquid. Rinse liquids are aqueous solutions comprising $K^+$, $Na^+$, $Cl^-$, $Ca^{2+}$, $O_2$, pH, $CO_2$, and $HCO_3^-$ in concentrations corresponding to human plasma. Non-limiting examples of suitable solutions commonly used for rinse, calibration and/or quality control purposes are given further below. When the whole blood sample or liquid is then brought in contact with the front side surface that is primed with a plasma compatible liquid, a representative sub-sample of components in the plasma phase of the whole blood sample or of the liquid is extracted and transferred in a very efficient and gentle manner by means of diffusion of the relevant components into the prefilled pore. In particular, any concentration gradient in the content of the analyte between the liquid and the reference liquid in the pores drives a diffusive transfer, thereby producing in the pores a sub-sample with an analyte concentration representative of the analyte concentration in the liquid.

According to an embodiment, there is presented a translucent element, wherein the pores are arranged to be rinsed by, such as solely by, diffusion.

In another operation mode (such as for use in embodiments where concentrations of analytes are measured), it may also be conceived to directly contact the front side of a dry sensor with a whole blood sample or a liquid. Further preferably in this operation mode, an inside surface of the pores is hydrophilic, thereby extracting the sub-sample from the whole blood sample or liquid at the front side of the translucent element into the pores by means of capillary forces. When operating a translucent element in this mode calibration could occur either via batch calibration as translucent elements produced from the same batch of porous membrane material tend to have equal sensitivity (equal light absorption when measuring on identical liquids using translucent elements produced from different pieces of porous membrane material from the same batch forming the translucent element). Alternatively, the pores of the translucent element can contain a calibration dye with absorption characteristics different from the analyte. The calibration dye is useful for normalizing/calibrating the optical probing signal, while being spectrally distinguishable from the substance in a plasma sample, e.g. bilirubin, to be detected/measured. Since the calibration dye will not be present in the actual liquid, the calibrant dye will diffuse out of the sensor during the measurement, mean—while the analyte diffuses into the pores of the sensor. By optically probing the pores before and after acquiring the liquid, a quantitative measure for the substance to be detected (e.g. bilirubin) may be developed by a comparison of the calibration reference and liquid substance signals.

The content of the pores can conveniently be probed optically from the back side of the translucent element, or more generally, from the side of the front surface/front side and/or of the one or more layers (if present) facing towards the translucent element, wherein the one or more layers (if present and including an optically absorbing layer) optically separates an optical probing region comprising the pores from the liquid contacting the front side of the translucent element, thereby preventing probing light from reaching and interacting with the liquid at the front side of the unit or the translucent element. The optical probing is thus selectively performed only on the sub-sample inside the pores. By 'probed (optically) from the back side (of the translucent element)' may generally be understood that incident probing light to the pores travels in a direction towards the front side from the backside (such as entering the translucent element via the backside in a direction from the backside to the front side) and light emitted from the pores to a receiving unit, such as a light detector, being emitted in a direction from the front side to the backside, such as being emitted from the back side in a direction away from the front side.

By 'one or more light sources being adapted to illuminate at least the pores in the translucent element' is understood any light source, such as any light source capable of providing sufficient light (or more particularly sufficient spectral flux within relevant wavelength ranges or enabling optically probing the analyte). The one or more light sources may comprise, e.g., an incandescent light source (such as a tungsten lamp), a fluorescent light source (such as a mercury vapor lamp), an LED light source or a LASER light source (such as an argon-ion gas laser).

'A light detector being adapted to at each of multiple points in time receive light emerging from the pores in response to illumination by the one or more light sources' is understood as is common in the art, and it may in particular be understood that "each point in time" may refer to a time stamp associated with an interval (such as a bin), such as the corresponding points in time corresponding to finite time intervals. 'A light detector' is understood as is common in the art, such as an electrically operated light detector, such as outputting a signal electrically and/or digitally. A 'light detector' is in the present context generally understood to be used synonymously and interchangeably with a 'detector'. It may furthermore be understood that "light detector" may comprise or encompass a plurality of (sub-)light detectors.

It is furthermore understood that 'the light detector is further adapted to generate one or more signals based on the received light, each of the one or more signals being temporally resolved and representative of at least a part of the received light' such as wherein the light detector is arranged to provide a temporally resolved signal, such as a digital or analog signal, comprising at least two (such as at least any one of 3, 5, 10, 100, 1000 or 10000) pairs of corresponding values of received light (such as received total intensity of the light or received intensity within a certain wavelength interval which possibly is only a part of the received light) and time.

Incident light is guided/directed to the optical probing region (comprising the pores) to ensure that the light traverses the pores and interacts with the (sub-sample) liquid therein. Preferably, the probing light is sent into the probing region at an oblique incidence with respect to a surface normal on the plane of the surface of the front side of the translucent element and/or one or more layers (if present), to ensure that the light traverses the pores filled with the liquid to be probed, thereby ensuring a maximum of optical interaction path length.

Light emerging from the pores in response to the illumination has interacted with the sub-sample in the pores and thus carries information on the sub-sample. The emerging light and/or a signal representative of the emerging light, such as the one or more signals, may then be analyzed, such as with the data processing device, with respect to that information in order to determine one or more time response values and optionally additionally a value representative of the analyte content in the whole blood sample or in the liquid (such as steady-state concentration in the pores). Analysis may include spectrally analyzing the emerging/detected light, and/or signal/data processing, e.g. for comparing the obtained signal with signals obtained on calibration/reference samples, for noise filtering, for applying corrections, and for removing artefacts. Spectral analysis may be carried out as is known in the art, such as by any method comprising multiple wavelengths in the incident light and means for resolving wavelengths in the detected signal (e.g., frequency-modulation or temporal or spatial separation of incident light of different wavelengths and/or wavelength-sensitive detection).

'Data processing device' is understood as is common in the art, and in particular as any device capable of receiving, processing and outputting information, such as digital information.

'Processor' is understood as is common in the art and in particular electronic circuitry capable of executing instructions that make up a computer program, such as a processing unit, such as a central processing unit (CPU).

By having the data processing device being arranged to determine one or more time response values based on the one or more signals, it is understood that the one or more time response values can change with a change in value(s) in the one or more signals.

The data processing device may furthermore be arranged for outputting a signal (an output signal) based on the one or more time response values. 'Outputting a signal' is understood as is common in the art, such as providing externally to the data processing device information indicative of the one or more time response values (such as '211 milliseconds') and/or a parameter based thereon (such the 'haptoglobin-bound hemoglobin present in liquid (sample)' in case it is further derived based on the one or more time response values that such complex is present).

The content and format of the (output) signal may take different forms, e.g., the format may be as a digital or analog signal. For example, the output signal may be digital information. In another example, the output of a signal is a visual and/or audible signal. The content may for example be a qualitative or quantitative value.

The data processing device may comprise or have access to (e.g., via a digital storage device operatively comprised within the data processing device and/or connected to the processor) predetermined instructions, such as predetermined instructions enabling the data processing device to take as input the one or more signals and determine the one or more time response values based on the one or more signals. The predetermined instructions can for example be implemented as or based on an algorithm or a look-up table. The predetermined instructions can for example be implemented as or based on a function or an algorithm comprising a model, such as a mathematical model, where datapoints of the one or more signals are fitted to the model, e.g., with regression analysis, yielding estimates of unknown model parameters (such as $\tau$ (tau)).

According to an embodiment, there is presented an apparatus wherein the one or more light sources and/or the light detector are operatively coupled to the data processing device comprising a processor, and wherein the data processing device comprising a processor is further arranged to:

obtain a plurality of signals for different wavelength intervals, such as each signal within the plurality of signals being obtained for a unique wavelength interval with respect to the wavelength intervals for the remaining signals within the plurality of signals, and determine a plurality of time response values by determining for each of the signals within the plurality of signals a time response value, such as wherein each time response value is determined based on a signal obtained for a different wavelength signal, such as obtained for a unique wavelength interval with respect to the wavelength intervals for the remaining signals within the plurality of signals.

An advantage of this may be that the apparatus may thus be capable of determining a plurality of time response values obtained from different wavelength signals, which may for example be representative of an analyte and a background, which may in turn be used for providing an adjusted time response value taking the background into account and hence providing a more accurate estimate of, e.g., a concentration based on a background adjusted time response value.

By 'operatively coupled' may be understood, that the data processing device comprising a processor is capable of operating with, such as controlling and/or receiving data from, the one or more light sources and/or the light detector.

By 'different wavelength intervals' may be understood non-identical, such as potentially overlapping wavelength intervals, such as substantially non-overlapping, such as non-overlapping wavelength intervals.

According to an embodiment, there is presented an apparatus wherein the data processing device is further configured to:
determine an adjusted time response value, wherein the adjusted time response value is determined based on at least two time response values within the plurality of time response values, such as wherein one time response value serves as a reference for another response value, such a wherein the two time response values have been obtained for signals obtained for different, such as unique, wavelength intervals.

An advantage of this may be that the apparatus may thus be capable of determining an adjusted time response value, e.g., for taking a background into account (cf., the comments above) and hence providing a more accurate estimate of, e.g., a concentration based on a background adjusted time response value.

According to an embodiment, there is presented an apparatus wherein the one or more light sources and/or the light detector is arranged for obtaining a plurality of signals for different wavelength intervals, such as each signal within the plurality of signals being obtained for a unique wavelength interval with respect to the wavelength intervals for the remaining signals within the plurality of signals. A possible advantage may be that the plurality of signals can reflect different analytes, such as enabling obtaining information on multiple analytes in a parallel manner. Another possible advantage may be that at least one signal may be employed as a reference or background signal, such as enabling taking a background into account in another signal. For example, before determining the time response value, a reference signal (such as a signal obtained at a wavelength or wavelength interval wherein an analyte of interest is not or sparingly optically active (such as below 30%, such as below 20%, such as below 10% of activity at a wavelength of probing light, such as at the highest activity wavelength)) is subtracted from another signal (such as a signal obtained at a wavelength or wavelength interval wherein an analyte of interest is optically active), such as wherein the resulting signal (ideally or in principle) is representative of the analyte without an overlaid background signal. By 'different wavelength' intervals is to be understood non-identical intervals, such intervals being partially or full overlapping or non-overlapping.

In embodiments, a time response value, e.g., obtained for a single wavelength (e.g., WL1) for example in a well-defined sample (such as a diluted sample) can be analyzed in order to determine, e.g., which one of several (possible otherwise indistinguishable) analytes is present.

According to an embodiment, there is presented an apparatus wherein the data processing device is further configured to determine an adjusted time response value, wherein the adjusted time response value is determined based on at least two time response values, such as wherein one time response value serves as a reference for another response value, such a wherein the two time response values have been obtained for signals obtained for different, such as unique, wavelength intervals. A possible advantage is that an influence of a background contribution in a signal comprising an analyte contribution is reduced or minimized. For example, the at least two time response values may be obtained at different wavelengths (such as for which an analyte is, respectively, is not optically active). In examples, the adjusted time response value is given as a ratio or a difference between two time response values.

WL1 signal can also be cleaned by subtracting the WL4 signal and then calculate the ratio of cleaned WL1 to WL4 signal.

Reference to WL1 may throughout this application be understood to be a first specific wavelength, such as 415 nm (which may be advantageously employed due to its identity or closeness to the hemoglobin peak wavelength at 415 nm or 416 nm).

Reference to WL4 may throughout this application be understood to be a second specific wavelength, such as 450 nm (which may be advantageously employed due to its remoteness to the hemoglobin peak wavelength at 415 nm or 416 nm, which in turn makes 450 nm suitable for use as a reference wavelength).

According to an embodiment, there is presented an apparatus wherein the data processing device is further configured to:
determine a ratio between:
A time response value obtained for a first wavelength interval, such as a single wavelength of 415 nm, and
A time response value obtained for a second wavelength interval, such as a single wavelength of 450 nm.

A possible advantage is that an influence of a background contribution in a signal comprising an analyte contribution is reduced or minimized. The ratio is applied because it utilizes another signal as an internal reference, which may be the most precise method. For example, the at least two time response values may be obtained at different wavelengths (such as for which an analyte is, respectively, is not optically active).

It is generally understood that the wavelength interval can be a 'single wavelength' whereby is understood, as the skilled person will be aware, a for practical purpose narrow interval effectively corresponding to the single (center-) wavelength, such as a peak centered around a certain wavelength, such as a Gaussian functions with a FWHM (full width, half max) of less than 20 nm, such as less than 10 nm, such as less than 5 nm, such as less than 2 nm, such as less than 1 nm.

An apparatus according to any of the preceding claims, wherein the one or more light sources and/or the light detector are operatively coupled to the data processing device comprising a processor, and wherein the data processing device comprising a processor is further arranged to:
obtain a first signal at a first wavelength interval, such as a first wavelength interval centered substantially at 415 nm, obtain a second signal at a second wavelength interval, wherein the second wavelength interval is different, such as unique, with respect to the first wavelength interval, such as the second wavelength interval centered substantially at 450 nm, and determine a ratio between:

A first time response value obtained for the first wavelength interval, and

A second time response value obtained for the second wavelength interval.

An advantage of this may be that the apparatus may thus be capable of determining time response values obtained from different wavelength signals, and determining a ratio, which may in turn enable that an influence of a background contribution in a signal comprising an analyte contribution is reduced or minimized. The ratio is applied because it utilizes another signal as an internal reference, which may be the most precise method. For example, the at least two time response values may be obtained at different wavelengths (such as for which an analyte is, respectively, is not optically active).

According to an embodiment, there is presented an apparatus wherein the one or more time response values are:

based on one or more differences in signal values within each of the one or more signals where said signal values are obtained at different points in time, and/or is one or more characteristic times, such as the one or more characteristic times each being representative of a duration of a change or a certain amount of a change in a parameter.

By 'based on one or more differences in signal values' may for example be understood that a time response value is calculated based on a difference in signal values, for example wherein a time response value is equal to a temporal difference between data points having a certain difference in signal values, e.g., a temporal difference between a first point having a signal value exceeding a certain deviation from a baseline signal value and a second point having a signal value exceeding a certain threshold, e.g., wherein the threshold is expressed as a percentage, such as 63% of a (subsequent) steady-state or saturation signal value, such as a 'rise time'. A time response value calculated in such manner may be independent of (model) assumption about the temporal development of the signal (except that it increases over time and eventually stabilizes).

Alternatively, by 'based on one or more differences in signal values' may be understood differences between signal values for signal values obtained at different times, such as a rate of change in signal value. For example, rates of change of signal values for two different wavelengths may be obtained and used for determining the difference measure.

By a 'characteristic time' may be understood a measure of the reaction time of a system. For example, for a system being or being modelled as a first-order, linear time-invariant system, the characteristic time may be given as $\tau$ (tau) as previously described.

According to an embodiment, there is presented an apparatus, wherein the apparatus is arranged so that the one or more signals generated at each of the multiple points in time is representative of a concentration of the analyte or the group of analytes in the pores. The skilled person will be readily capable of devising an apparatus so that, at least within for certain concentrations, the one or more signals generated at each of the multiple points in time is representative of a concentration of the analyte or the group of analytes in the pores. For example, the apparatus can be arranged so that the signal values reflect any one or more of an absorbance at a wavelength wherein a sought-after analyte absorbs or a fluorescence intensity (wherein a light source excites a fluorophore of an analyte at a first wavelength, and a detector detects emitted fluorescence at another wavelength).

According to an embodiment, there is presented an apparatus, wherein the data processing device is further configured to determine a concentration of the analyte or the group of analytes in the liquid based on the one or more signals.

A possible advantage may be that additional information is gained, such as not only is one or more time response values obtained, but also concentration. Concentration in the liquid may be determined as a steady-state or saturation concentration in the pores. The concentration in the pores may, e.g., be determined based on modelling, calculations and/or a calibration.

According to an embodiment, there is presented an apparatus, wherein the determined concentration of the analyte or the group of analytes in the liquid is based on the one or more time response values. The concentration of the analyte or the group of analytes in the liquid may not be determined alone by a signal value, such as a saturation signal value. This may in particular be the case if a plurality of optically indistinguishable analytes are present. For example, in case two optically indistinguishable analyte are present, a saturation signal value—which could otherwise directly enable deriving concentration—would then be a result of a contribution from both analytes, such as a (weighted) sum. However, the time response values may enable determining which of the analytes are present and/or a ratio between them, which in turn enable disentangling their separate contributions to the signal values and deriving the concentration of each of one or both analytes.

Alternatively, or in addition, the determined concentration of an analyte may be adjusted—based on the one or more time response values—with respect to a (directly) measured concentration of the analyte. For example, if a certain potassium ion concentration and a certain concentration of haptoglobin-bound hemoglobin is measured, a determined concentration of potassium may be given by the measured value minus an estimated interference value, wherein the determined concentration aims to estimate a true patient potassium value, i.e., excluding a potassium contribution from in vitro hemolysis (as determined by the concentration of haptoglobin-bound hemoglobin).

More particularly, for example for potassium ions: If haptoglobin is present, an impact factor or interference effect from cfHb is estimated by multiplying a proportional factor (0.3 mM/(100 mg/dL cfHb)) with the measured cfHb concentration—regardless of cfHb being bound to haptoglobin or not. An estimate of a true patient value potassium ion concentration is estimated as the measured potassium concentration minus said impact factor (due to an assumption that haptoglobin's presence is an indication that hemolysis occurred in vitro and hence potassium ions from red blood cells have increased a potassium concentration in the sample relative to a potassium concentration in the patient). A similar principle is applicable for other analytes, and according to embodiments the method further comprise correcting hemolysis sensitive parameters, such a $K^+$, $Ca^{++}$ and'/or $Na^+$, for the determined in vitro/ex vivo hemolysis.

According to an embodiment, there is presented an apparatus wherein the data processing device is further configured to determine if a concentration of the analyte or the group of analytes in the liquid is above a first predetermined concentration value and/or is below a second predetermined concentration value, such as is within a predetermined interval. A possible advantage of this may be that distinguishing analytes from each other based on time response values may work particularly well, such as only, within a certain concentration range, and by checking if the concentration is within such range information can be gained regarding a possibility or validity of distinguishing the analytes based on time response values.

According to an embodiment, there is presented an apparatus wherein the pores are functionalized, such as functionalized with one or more bioreceptors, such as human serum albumin. By 'functionalized' may be understood that an element is added to the pores with a view to increase their functionality towards a certain (sensor) purpose, such as chemical or biological functionalization comprising immobilizing chemo- or biorecognition elements such as enzymes, antibodies, and aptamers within the pores (on the sides or in a matrix) such that, e.g., a specificity and or sensitivity increases.

According to an embodiment, there is presented an apparatus wherein the data processing device is arranged to detect the analyte or the group of analytes, such as distinguish between the analyte and one or more other analytes with different molecular weights and optionally similar optical properties, based on the one or more time response values, such as the one or more time response values and a concentration of one or more analytes in the liquid. By 'detect the analyte or the group of analytes' may be understood both qualitatively detecting a presence (yes/no) of an analyte and quantitatively determining a concentration, such as on an ordinal, interval or ratio type scale.

According to an embodiment, there is presented an apparatus wherein the data processing device is further arranged to determine a difference measure indicative of a difference, such as an absolute or relative difference, in concentration between two or more predetermined analytes in the liquid based on the one or more time response values. The 'difference measure' may for example be a relation, such as a ratio between two analytes, e.g., the ratio concentration$_{analyte\ 1}$/concentration$_{analyte\ 2}$ between two (possibly optically indistinguishable) analytes. Alternatively, the 'difference measure' may be an absolute value, such as the difference concentration$_{analyte\ 1}$ minus concentration$_{analyte\ 2}$. A possible advantage may be that the embodiment enables providing information on the concentrations of analytes, which may in particular be relevant if the analytes are optically indistinguishable.

According to an embodiment, there is presented an apparatus wherein the two predetermined analytes are Human Serum Albumin bound bilirubin, such as HSA-bilirubin, and bilirubin not bound to human serum albumin, such as free bilirubin.

In a particularly advantageous embodiment, it is the coloring of the plasma by bilirubin that is probed optically, e.g. by using spectrally resolved absorbance measurements, or by measuring the spectrally integrated absorbance over a predetermined bandwidth within a spectral range indicative of the presence of bilirubin in the liquid sub-sample, such as within a spectral range of wavelengths 380 nm-750 nm, such as within a spectral range of wavelengths 400 nm-520 nm, or at about 455 nm.

According to an embodiment, there is presented an apparatus wherein the two predetermined analytes are cell-free Hemoglobin not bound to haptoglobin and haptoglobin bound hemoglobin, such as a hemoglobin-haptoglobin complex.

According to an embodiment there is presented an apparatus, wherein the apparatus, such as said apparatus being a blood gas analyser, is further arranged for measuring a concentration in the liquid sample of one or more or all of:
Carbon dioxide, such as $CO_2$,
Oxygen, such as $O_2$, and
pH.

An advantage of having such (blood gas analyzer) apparatus may be that it enables providing further relevant liquid (blood) sample parameters, such as wherein—via the output—a user (even a non-specialized) user may be informed, e.g., if one or more analytes may be associated with a (too) high cell-free hemoglobin interference criticality, such as wherein retesting may be necessary. An advantage may for example be, that it provides a relevant solution for point-of-care testing, where one or more or all of fast response times, relevant output to non-specialized users and a plurality of parameters may be particularly relevant.

According to an embodiment there is presented an apparatus wherein the apparatus is arranged for optically probing the liquid disposed inside the pores from the side of the front side facing the back side. A possible advantage may be that it enables avoiding that light has to traverse liquid outside of the pores (such as in front of the front side) on its way to and/or from the pores, which could have led to a contribution to (such as contamination of) an optical probing signal from constituents in the liquid outside of the pores (where it is noted that the pores may in themselves be beneficial for effectively filtering the liquid for the purpose of enabling obtaining a signal only from constituents small enough to enter the pores).

According to an embodiment there is presented an apparatus comprising both one or more light sources, such as the one or more light sources, and at least a light detector, such as the light detector, and wherein each of the one or more light sources and the light detector is placed on the side of the front side facing the back side, such as outside of the translucent element on the same side of the front side as the backside. This may be advantageous for facilitating a simple and/or efficient apparatus, such as for optically probing the liquid disposed inside the pores from the side of the front side facing the back side.

According to an embodiment there is presented an apparatus wherein
the one or more light sources is adapted to illuminate at least the pores in the translucent element, from the side of the front side facing the back side, and/or
the light detector is arranged to receive light emerging from the pores, such as emitted in response to an illumination by one or more light sources, such as the one or more light sources, and wherein the light detector is adapted to generate a signal representative of the received light, which has been emitted, such as primarily emitted, from the pores in a direction away from the front side in a direction facing the back side.

This may be advantageous for facilitating a simple and/or efficient apparatus, such as for optically probing the liquid disposed inside the pores from the side of the front side facing the back side.

According to an embodiment there is presented an apparatus wherein
the one or more light sources is adapted to illuminate at least the pores in the translucent element, such as from the side of the front side facing the back side, wherein light from the one or more light sources reaching the pores need not have traversed a volume being fluidically connected with the pores and being outside of the translucent element, such as on the side of the front side opposite the back side, and/or the light detector is arranged to receive light emerging from the pores, such as emitted in response to an illumination by one or more light sources, such as the one or more light sources, and wherein the light detector is adapted to generate a signal representative of the received light, wherein light emitted from the pores and reaching the light detector need not have traversed a volume being fluidically connected with the pores and being outside of the translucent element, such as on the side of the front side opposite the back side. A possible advantage may be that by avoiding that light has to traverse liquid outside of the pores (such as in front of the front side) on its way to and/or from the pores, a contribution to (such as contamination of) an optical probing signal from constituents in the liquid outside of the pores may be reduced, minimized or eliminated (where it is noted that the pores may in themselves be beneficial for effectively filtering the liquid for the purpose of enabling obtaining a signal only from constituents small enough to enter the pores).

According to an embodiment, there is presented a translucent element wherein a cross-sectional dimension of the openings of the pores is 1 μm or less, such as 800 nm or less, such as 500 nm or less, such as 400 nm or less, and/or wherein a length of the pores in an axial direction along the pores is less than 100 μm and optionally larger than 5 μm, such as less than 50 μm, such as less than 30 μm, such as 25 μm.

By using pores having an opening in the plane of the front side of the translucent element with a maximum cross-sectional dimension of about 1 μm or less, or preferably in the submicron range, such as about 800 nm or less, such as about 500 nm or less, or even about 400 nm or less, any cellular components including erythrocytes, leuco-cytes, and thrombocytes (platelets), are prevented from entering the pores.

Further surprisingly, pores with an opening having a cross-sectional-dimension of about 500 nm or less have an increased sensitivity as compared to larger pores, such as pores having an opening with a cross-sectional dimension of about 800 nm or above, but having the same total pore volume/volume porosity.

Most preferably, the pores have a minimum opening with a respective minimum pore volume to allow for the efficient extraction of a sufficiently large sub-sample that can still be probed with an acceptable signal to noise ratio. Advantageously, the pores have an opening of about 30 nm or more, or 50 nm or more, or 100 nm or more, or about 200 nm or more.

Suitable pores may be produced e.g. from transparent polymer membranes with so-called track-etched pores, similar to those available from the company IT4IP (IT4IP s.a./avenue Jean-Etienne Lenoir 1/1348 Louvain-la-Neuve/Belgium) with the modification that the pores are closed at one end. Through-going pores in the mem-branes may be closed e.g. by laminating a backing sheet to the backside of the porous membrane, or by decelerating the ions such that the ion-bombardment tracks, and thus the pores etched following these tracks, stop within the transparent polymer membrane to form dead end pores. The membrane is typically backed by a stiff transparent element to provide adequate mechanical strength to the translucent element.

According to an embodiment, there is presented a porous wherein the translucent element is made of a transparent polymer.

According to an embodiment, there is presented a porous wherein the pores are track-etched in the translucent element and optionally in the one or more layers if present.

The transparent element should preferably be made of a material that does not absorb light and at the same time it should be possible to produce the dead end pores in the material e.g. by track etching the material. Material suitable for this is polyethylene terephthalate (PET or PETE) or an analogue of PET (polyethylene terephthalate pol-yester (PETP or PET-P)) or a polycarbonate (PC). The transparent element may com-prise a hydrophilic coating of e.g. polyethylene glycol (PEG) to increase the diffusion into the pores. The hydrophilic coating may be chosen according to the use of the translucent element. In some use cases, the translucent element will never dry out, once it is in use and it therefore only needs to be hydrophilic at startup. For other uses of the translucent element, it needs coating that keeps it hydrophilic permanently for allowing the translucent element to dry out and still be useable afterwards when the translucent element is re-wetted for a further use.

According to an embodiment, there is presented a translucent element wherein
a porosity of a given volume of the translucent element comprising pores is between 50% and 5% by volume, such as between 30% and 10% by volume, such as 15% by volume.

The pores create porosity in the translucent element (or in a given region of the translucent element) with a corresponding front side surface area over which the openings of the pores are distributed. The porosity may be characterized in terms of the volume of the voids created in the translucent element by the pores, i.e. the pore volume, wherein the pore volume is referred to the volume of the translucent element penetrated by the pores. This volume is here defined as the volume between the front side area over which the pores are distributed and the identical parallel area shifted into the translucent element by the maximum depth of penetration of the pores into the translucent element as seen in an axial direction perpendicular to the front side of the translucent element.

In addition thereto, the porosity may be further characterized in terms of the integrated pore volume, which is equal to the sub-sample volume that is available for optical probing. The pore volume may conveniently be expressed as an equivalent pore volume depth DELTA, which is the pore volume referred to the corresponding front side area over which the pore openings are distributed. Accordingly, the porosity of the translucent element can be converted into an equivalent pore volume depth DELTA as follows. The pores having an opening within a given front side area A have a total pore volume V. The equivalent pore volume depth is then calculated as the total pore volume divided by the given front side area: DELTA=V/A.

According to an embodiment, there is presented a translucent element wherein
an equivalent pore volume depth (DELTA) is less than 20 μm, such as less than 10 μm, such as 5 μm or less, wherein the equivalent pore volume depth (DELTA) is defined as the total volume of the pores (V) divided by the front side area (A) over which the openings of the pores are distributed.

Thereby, a small sub-sample with a representative concentration of relevant components is obtained. A small sub-sample volume is desirable to promote a fast sub-sample exchange, thereby reducing response time of the translucent element, and cycle time of measurements using the translucent element. A small sub-sample volume is further desirable in order to avoid effects of depletion of boundary layers of a plasma fraction in a whole blood sample close to the front side of the translucent element. Such depletion effect may otherwise occur in small, still standing samples, where e.g. red blood cells may obstruct an efficient diffusive exchange of relevant components from the volume of the whole blood sample towards the boundary layer at the front side of the translucent element, if the equivalent pore volume depth exceeds a critical value.

Preferably, an equivalent pore volume depth DELTA is at least 1 µm, alternatively at least 2 µm, or in the range from 3 µm to 5 µm, wherein the equivalent pore volume depth is defined as above. A larger sub-sample volume is desirable to achieve a better signal-to-noise level due to a larger sub-sample volume contributing to the optically probed information on the relevant components in the plasma.

Further according to some embodiments, a useful compromise between reducing response time, reducing cycle time, and/or avoiding depletion effects in small still standing whole blood samples or liquids on the one hand, and a required or desired signal-to-noise ratio on the other hand is found for an equivalent pore volume depth DELTA in the range from 1 µm to 20 µm, preferably in the range from 2 µm to 10 µm or at about 4 µm-5 µm.

Advantageously according to one embodiment the translucent element is supported by a translucent backing attached to the back side of the translucent element. Thereby, an enhanced mechanical stability is achieved.

According to an embodiment, there is presented a translucent element wherein a transparent backing slide of the translucent element is provided with 45°-75° angled surface (such as no corners on the outside of the translucent element, the corners are "cut off" to obtain 45°-such as 60°, surfaces instead), such as 60° angled surface, with respect to a front side surface, to minimize the effect of the shift in refractive index between outside air and the transparent backing slide.

Further according to one embodiment of a translucent element according to the invention, the transparent backing attached to the back side of the translucent element has such a thickness that 60° prisms (i.e. no 90° corners on the outside of the translucent element, the corners are "cut off" to obtain 60° surfaces instead) are positioned on the outside of the transparent backing for the light from the light source and to the detector is having an increased angle of incidence for the light reaching the pore zone. A possible advantage of having, e.g., 60° prisms will also increase the chance of the light travelling inside the translucent element because the light is reflected at the surfaces of the backing so there will be multiple reflections before the emerging light reaches the detector.

Further according to one embodiment of a translucent element according to the invention, an inner wall surface of the pores is hydrophilic, e.g. coated with a hydrophilic coating. Thereby, an efficient capillary driven filling of dry pores with liquid is achieved. Furthermore, a hydrophilic coating prevents certain hydrophobic substances, such as hydrophobic dyes, hemoglobin, and other proteins, from depositing inside the pores that would otherwise lead to a gradual fouling of the sensor, which is difficult to wash out with an aqueous solution. Thus, an improved device for the detection of an analyte in a liquid with a fast and reliable response may be enabled.

According to an embodiment, there is presented a translucent element wherein an inner wall surface of the pores is coated with a hydrophilic coating.

Further according to one embodiment of an apparatus according to the invention, the light source is configured for providing an obliquely incident illuminating beam from the backside of the translucent element, wherein an illumination angle is defined as the angle of the incident beam with respect to a surface normal of a reference plane defined by the front side of the translucent element. Thereby, an increased optical interaction length is achieved, thus enhancing the interaction of the incident light with the content of the pores before it leaves the probing region for detection by the detector. Furthermore, penetration of probing light into the liquid through the pore openings is prevented, due to a reduced apparent cross-section of the pore openings, as well as increased scattering spreading light into the probing region rather than through the pore openings into the liquid space on the other side of the reflective layer.

The light source may in principle be any light source that transmits light in a region where the analyte in the pores absorb light in order for the system to work, but preferably the source should have a flat spectrum characteristic, i.e. the spectrum contains no peak amplitude, as a flat characteristic will give a better response. If the light source has a non-flat spectrum, i.e. the light source has a peak amplitude; a slight change in the peak may erroneously be interpreted as a change in absorption. Due to their properties with respect to size, weight, efficiency etc. light emitting diodes are often preferred. Further according to one embodiment of a sensor according to the invention, the detector is configured to collect light obliquely emerging from the backside of the translucent element, wherein a detection angle is defined as the angle of the propagation of the emerging light towards the detector with respect to a surface normal of a reference plane defined by the front side of the translucent element. The detector is configured to collect light emerging in response to illumination by the light source of the optical probing arrangement. Detecting light obliquely emerging from the backside of the translucent element reduces contributions to the detected signal from light emerging from the whole blood sample and leaking back through the front side surface and the one or layers (if present) into the probing region.

The detector may be a photodiode or a spectrometer that is able to detect the absorption in the entire spectrum. Alternatively, an array or diodes may be used, where each diode emits light at different wavelengths, and a photodiode is used as a detector. The diodes may be multiplexed to emit light in different intervals. The absorption is then found by comparing the lights emitted from a diode in that particular interval compared with the light detected by the photodiode.

Further according to one embodiment of an apparatus according to the invention, a plane of incidence and a plane of detection intersect at a surface normal to enclose an azimuthal angle of at least 0 degrees, and less than 180 degrees, preferably less than 160 degrees, preferably less than 130 degrees, or preferably about 90 degrees, wherein the plane of incidence is spanned by the direction of the illuminating beam and the surface normal to the reference plane, and wherein the plane of detection is spanned by the direction of the emerging light propagation towards the detector and the surface normal to the reference plane. Thereby, contributions to the detected signal of glare from partial reflections at optical interfaces prior to passing the probing region are reduced. Such glare of light that has not interacted with the sub-sample in the probing region does not comprise relevant information and is therefore detrimental to the signal-to-noise ratio.

Optical probing light may be performed by any suitable optical probing arrangement. Such optical probing arrangement may include merely directing a beam of light to the backside of the translucent element and directing the input of an optical detector to the illuminated region. The optical arrangement may include further optical elements improving coupling of the probing light into the translucent element and improving coupling of the light emerging from the translucent element into the detector input. Such optical elements may include one or more prisms and/or lens arrangements attached/glued directly to the backside of the translucent element. Preferably, the coupling optics accommodates the "reflective" nature of the optical probing, where incoming probing light and detected emerging light are kept on the same side of the front side surface of the translucent element. Further improvements may be sought in enhancing the optical interaction of the probing light with the pores, e.g. by coupling the probing light into the translucent element at a first end, forcing the light in the probing region to essentially propagate in directions parallel to the front side of the translucent element, along the front side surface of the translucent element and traversing the pores, and collecting the emerging light from another end of the translucent element, which may be transverse or opposite of the first end.

When light sources age, they might change characteristic, e.g. emit less light or drift may affect the peak amplitude. This may be compensated by using a feedback calibration process, where the detector measures the light received through the translucent, such as transparent, element in a situation where the pores in the translucent, such as transparent, element is expected to be clean, i.e. contain no molecules in the pores absorbing light. If the amplitude of the light received is smaller than expected, the feedback loop to the light source may control that the current or voltage to the light source is increased, to compensate for the degradation of the light source. Alternatively, if the light source has changed characteristics, the calculation of the actual absorption when measuring may adjust for this change of the emitted light compared to the original factory calibration.

Advantageously according to one embodiment the detector includes a spectrophotometer and an optical probing device is configured for the spectrophotometric analysis of the light emerging from the probing region in the translucent element. This allows for resolving the spectral signature of one or more relevant components in the light emerging from the sub-sample in the probing region.

Further according to a particularly advantageous embodiment, the optical probing device is configured for measuring absorbance. Thereby a surprisingly significant signal is obtained with a relatively simple optical set-up. This allows for easy integration of the sensor with more complex analysis set-ups, such as a blood analyzer system.

Several optically active components can be found in blood, e.g. bilirubin, carbon di-oxide ($CO_2$), Patent Blue V and methylene blue. The translucent element makes it possible to detect bilirubin with a sensitivity high enough to be able to report natural adult bilirubin concentrations. The dye Patent Blue V may be used in lymphangiography and sentinel node biopsy to color lymph vessels. It may also be used in dental disclosing tablets as a stain to show dental plaque on teeth. Methylene blue is used in treatment towards high methemoglobin concentrations in patients and in as treatment of some urinary tract infections.

When analyzing the resulting spectrum from the translucent element it became apparent that the absorption spectra from whole blood or plasma has a negative baseline. The negative baseline is caused by the translucent element reflecting a higher proportion of the incoming light towards the detector when measuring on whole blood or plasma than compared to rinse.

The effect can be seen at high wavelengths (600 to 700 nm) where hemoglobin does not absorb. The effect arises from the higher refractive index caused by the high protein content in plasma as compared to rinse. The effect is about 5 mAbs (where Absorbance, Abs, is an optical unit, where 1 Abs causes a damping to 10% of the original light intensity, and where mAbs refers to milli-Abs), compared to the hemoglobin having about 15 mAbs at the hemoglobin peak wavelength (416 nm). With the detector utilizing a reference determination of the light intensity from the source, it will be possible to detect protein (human serum albumin, HSA) content of whole blood samples with a detection limit of about 1-5 g/L.

However, amplitude (and sign of amplitude) of baseline (shift) is dependent on geometry of the setup (if angle between light in and light out is small (below about 40°), then a positive baseline is observed, and opposite if angle is large).

The translucent element can be used as a reading device for color producing/consuming assays. The advantage being that it is not necessary to produce plasma before the assay.

The following types of assays may be used with the translucent element:
  Sandwich assays, where the receptor ligand could be bound inside the membrane channels.
  Assays where one part is bound in the pores, e.g. Bromocresol Green Albumin assay, which use bromocresol green, to form a colored complex specifically with albumin. The intensity of the color, measured at 620 nm, is directly proportional to the albumin concentration in the liquid.
  Enzyme activity assays as e.g. the aspartate aminotransferase (AST) activity assay kit, where the transfer of an amino group from aspartate to α-ketoglutarate results in the generation of glutamate, resulting in the production of a colorimetric (450 nm) product proportional to the AST enzymatic activity present.

The translucent element could also be used in non-medical applications such as beer brewing, wastewater analysis, food testing and in dye production. In beer brewing a precise color is desired. The translucent element could be used to determine whether or not the beer has the desired color or not by measuring on the liquid and compare the reading with a liquid of correct color. Wastewater could be analyzed for presence or absence of a constituent. In food testing, liquids such as milk, juices and other slurries, the translucent element could be used for analysis for presence or absence of a constituent or analyte. Other chemical reactors e.g. the dye industry could be using the translucent element to obtain the desired color, content or other chemical properties for their liquids.

Advantageously according to some embodiments, the translucent element or a blood analysis system or apparatus comprising the translucent element further comprises a processor configured for comparing the signal generated by the detector with a predetermined calibration reference to develop a quantitative measure of the analyte level in the liquid.

Further advantageously according to some embodiments, the calibration reference is obtained on a dye-based calibration solution, such as an aqueous solution comprising tartrazine dye. Preferably, the dye-based aqueous solution is prepared from a typical rinse liquid with the addition of the calibrant dye, such as tartrazine.

According to an embodiment, there is presented an apparatus wherein the translucent element comprises, such as predominantly comprises, such as comprises 50 w/w % or more, such as consists of, material, which has an attenuation coefficient so that an, optionally partially or wholly diffuse, transmission coefficient of light through the material, such as disregarding any interface effects, is at least 50% for a length through the material of 100 micrometers, such as a fraction of light not making it through a length of material is equal to or less than 50% pr. 100 micrometer, such as equal to or less than 40% pr. 100 micrometer, such as equal to or less than 20% pr. 100 micrometer, such as equal to or less than 10% pr. 100 micrometer, such as equal to or less than 5% pr. 100 micrometer, such as at least for one wavelength within the range from 380 nm to 750 nm, such as from 400 to 520 nm, such as within the range from 400-460 nm, such as within the range from 415-420 nm, such as at or about 415 nm or at or about 416 nm or at or about 450 nm or at or about 455 nm. This may in a simple manner enable attaining the translucent properties of the translucent element.

According to an embodiment, there is presented an apparatus comprising a porous unit, which comprises the translucent element and which is further comprising an optical assembly comprising a light guide core, the light guide core comprising an input branch, an output branch, and a coupling interface arranged to contact the backside (4) of the translucent element opposite to the front side, such as wherein the input branch and the output branch are arranged in a common light guide plane arranged perpendicular to a front side surface. The optical assembly, optionally coupled to the back side of the porous unit, may enable performing (such as performing in an efficient, simple and/or well-controlled manner) optical measurements, such as selective optical measurements, on the fluid, such as liquid, in the pores from the back side (such as incident probing light to the pores entering in a direction towards the front side from the backside and light emitted from the pores to the light detector being emitted in a direction from the front side to the backside) of the porous unit, such as also discussed elsewhere in the present text. A possible advantage of having the optical assembly coupled, such as rigidly coupled, to the back side of the porous unit, may be that the porous unit and the optical assembly can then together form a unit or cassette, such as a sensor unit or a sensor cassette, which can be inserted and removed from a (sensor) system or apparatus, such as form a consumable, which may enable in an efficient manner overcoming—by replacement—problems with wear and/or contamination of the porous unit (such as contamination of the pores), where integration, such as effective integration, with one or more peripherals, such as optical peripherals, such as light source and/or receiving unit, such as a light detector, may be enabled and/or facilitated via the optical assembly. In an embodiment, the optical assembly is as described in the application WO2021123441A1 (wherein it is possibly referred to as optical sub-assembly), which is hereby incorporated in entirety by reference, such as described in FIGS. 1-9 and the accompanying text of said application, which are hereby additionally specifically incorporated by reference. The input and output branches may be directed towards a coupling interface between the optical assembly and the translucent element, such as the backside of the translucent element.

According to an embodiment, there is presented an apparatus comprising a porous unit, which comprises the translucent element porous unit and which is further comprising a housing penetrated by a flow channel defining an axial direction, the flow channel comprising a sample space and being arranged so that the porous unit with a front side defining a sensor surface for contacting the liquid, such as when the liquid is in the sample space, the sensor surface facing towards the sample space, such as wherein the pores are configured with regard to the analyte in the liquid for diffusive liquid communication with the sample space. A possible advantage of having such housing, optionally rigidly coupled to the porous unit, such as the front side of the porous unit, may be that the porous unit and the housing (and optionally furthermore the optical assembly) can then together form a unit or cassette, such as a sensor unit or a sensor cassette, which can be inserted and removed from a (sensor) system or apparatus, such as form a consumable, which may enable in an efficient manner overcoming—by replacement—problems with wear and/or contamination of the porous unit (such as contamination of the pores), where integration, such as effective integration, with one or more peripherals, such as a (micro-)fluidic system (and optical peripherals in case of the optical assembly), may be enabled and/or facilitated via the optical assembly. In an embodiment, the housing (and optionally the optical assembly) is as described in the application WO2021123441A1 (wherein the optical assembly is possibly referred to as optical sub-assembly), which is hereby incorporated in entirety by reference, such as described in FIGS. 1-9 and the accompanying text of said application, which are hereby additionally specifically incorporated by reference.

According to an embodiment, there is presented an apparatus comprising a porous unit, which comprises the translucent element and the optical assembly and optionally the housing and wherein the porous unit forms a cassette, such as a coherent unit which can form part of the apparatus, such as wherein the cassette can be operatively and reversibly (in an optionally non-destructive manner) connected to the remainder of the apparatus. In a further embodiment, the cassette and the remainder of the apparatus can be connected by a transition fit, such as a reversible friction fit. By a 'transition fit' is understood a fit where the parts to be held together are held securely, yet not so securely that it cannot be disassembled, such as disassembled without tools, such as disassembled by the hands a human, such as a normal person. In a further embodiment, different parts of the equipment are kept together by a mechanical locking member, such as one or more or all of: A pin (such as a split pin, or a spring pin), a click-lock (such as a lock wherein a spring loaded engagement member positioned on one part engages with a cavity or edge on another part upon assembly, so that the spring force has to be overcome before disassembly), a detent ball, a hand-operable screw, such as a tommy screw, or a wing screw. It may be understood that any of the mechanical locking members may serve to retain the parts together, but also that any of the mechanical locking members may optionally be overcome or removed without tools, such as by the hands of a human, such as a normal person.

According to an embodiment, there is presented an apparatus comprising a porous unit, which comprises the translucent element and the optical assembly and optionally the housing, such as said porous unit being a cassette being operatively and reversibly connectable to the remainder of the apparatus.

According to an embodiment, there is presented an apparatus wherein the apparatus is configured for measuring (optionally spectrally resolved) absorbance, such as absorbance of a liquid in the pores. An advantage of this may be that it enables in a simple way obtaining information, such as information of concentration, of an analyte in the liquid in the pores.

According to some embodiments, a method of optically detecting an analyte in a liquid comprises the steps of providing a translucent element as disclosed above; contacting the translucent element with a reference liquid so as to fill the pores with the reference liquid; contacting the front side of the translucent element with a liquid; waiting for a diffusion time to allow for diffusion of the analyte in the liquid into the pores to stabilize; optically probing the liquid inside the pores; and, based on the result of the optical probing, establishing an analyte level of the liquid. Preferably, the reference liquid is an aqueous solution that is compatible with the liquid, and in particular with the fraction thereof that may enter the pores, such as a liquid for rinse, calibration and/or quality control. Most advantageously, an analyte is detected optically in the pores by the color change due to the presence of the analyte in representative amounts in the extracted sub-sample.

Advantageously according to some embodiments, optical probing comprises illuminating the translucent element with probing light from the backside and performing a spectrophotometric analysis of the light emerging from the backside of the translucent element as an optical response to the probing light.

Advantageously according to some embodiments, optical probing is measuring the absorbance.

Advantageously according to some embodiments, the method further comprises the step of comparing the optical response with a predetermined calibration reference to develop a quantitative measure of the analyte level in the liquid.

Further advantageously according to some embodiments of the method, the calibration reference is obtained on a dye-based calibration solution, such as an aqueous solution comprising tartrazine dye. Preferably, the dye-based aqueous solution is prepared from a typical rinse liquid with the addition of the calibrant dye, such as tartrazine.

In an embodiment there is presented a method wherein the analyte is
  cell-free hemoglobin,
  bilirubin, and/or
  total protein content.

In an embodiment there is presented a method wherein the liquid is a whole blood sample or wherein the liquid is a plasma phase of a whole blood sample.

In an embodiment there is presented a method, further comprising:
  contacting the translucent element with a reference liquid so as to fill the pores, such as so as to fill the pores by diffusion, with the reference liquid, and/or
  waiting for a diffusion time to allow for diffusion of the analyte in the liquid into the pores to stabilize.

In the context of point-of-care measurement systems or apparatuses (in the art also referred to as 'bedside' systems or apparatuses) and laboratory environments alike, blood gas analysis is oftentimes undertaken by users, such as nurses, who may not be users trained in use of, e.g., blood gas analyzers.

According to another aspect of the invention, there is presented use of a use of an apparatus according to the first aspect of the invention for point-of-care (POC) measurements, such as for point-of-care determination one or more time response values of an analyte or a group of analytes in a liquid, such as whole blood, such as in a whole blood sample.

POC measurement is also referred to as 'bed site' measurement in the art. In the present context, the term 'point-of-care measurement' should be understood to mean measurements which are carried out in close proximity to a patient, i.e. measurements that are not carried out in a laboratory. Thus, according to this embodiment, the user of the apparatus, such as the apparatus being a blood gas analyzer, performs measurement of a whole blood sample in a handheld blood sample container in the proximity of the patient, from whom the blood sample is taken, e.g. in the hospital room or ward accommodating the patient's bed, or in a nearby room of the same hospital department. In such use, the level of expertise of the user oftentimes varies from novice to experienced, and the capability of the blood gas analyzer to automatically output instructions matching each individual user's skills on the basis of sensor input is thus particularly beneficial in such environments.

According to a second aspect of the invention, there is presented a method for determining one or more time response values of an analyte or a group of analytes in a liquid, such as in whole blood, such as in a whole blood sample, comprising
  providing an apparatus according to the first aspect,
  contacting the pores of the apparatus with the liquid,
  illuminating with the one or more light sources at least the pores in the translucent element,
  at each of multiple points in time receiving light emerging from the pores in response to the illumination,
  generating one or more signals based on the received light, each of the one or more signals being temporally resolved and representative of at least a part of the received light, and
  determining one or more time response values based on the one or more signals.

According to an embodiment, there is presented a method further comprising detecting the analyte or a group of analytes, such as distinguishing between the analyte and one or more other analytes with different molecular weights and optionally similar optical properties, based on the one or more time response values, such as the one or more time response values and a concentration of one or more analytes in the liquid.

According to an embodiment, there is presented a method wherein
  the analyte is:
    bilirubin, such as free-bilirubin, or
    Human Serum Albumin bound bilirubin, such as HSA-bilirubin,
  wherein the group of analytes is a group comprising:
    bilirubin, such as free-bilirubin, and/or
    Human Serum Albumin bound bilirubin, such as HSA-bilirubin
  the analyte is:
    cell-free hemoglobin not bound to haptoglobin, or
    haptoglobin bound hemoglobin, such as a hemoglobin-haptoglobin complex, or
  wherein the group of analytes is a group comprising:
    cell-free hemoglobin not bound to haptoglobin, and/or
    haptoglobin bound hemoglobin, such as a hemoglobin-haptoglobin complex.

A possible advantage of determining cell-free hemoglobin not bound to haptoglobin and/or haptoglobin bound hemoglobin, such as a hemoglobin-haptoglobin complex is that it might enable determining if hemolysis in a sample occurred in vivo or in vitro, which might in turn enable determining if concentrations of certain entities (such as potassium ions)

in the sample represent true patient values, and/or optionally allows estimating true patient values from measured values.

According to an embodiment, there is presented a method wherein the method further comprises determining a difference measure indicative of a difference, such as an absolute or relative difference, in concentration between two or more predetermined analytes in the liquid based on the one or more time response values.

According to a further embodiment, there is presented a method wherein the two predetermined analytes are
Human Serum Albumin bound bilirubin, such as HSA-bilirubin, and bilirubin not bound to human serum albumin, such as free bilirubin, or
cell-free hemoglobin not bound to haptoglobin and haptoglobin bound hemoglobin, such as a hemoglobin-haptoglobin complex.

According to an embodiment, there is presented a method further comprising contacting the apparatus with a reference liquid so as to fill the pores with the reference liquid, and/or waiting for a diffusion time to allow for diffusion of the analyte or the group of analytes in the liquid into the pores to reach a steady state.

According to a third aspect, there is presented a computer program, such as a computer program product, comprising instructions which, when the program is executed by a computer, cause the computer to
Receive one or more signals representative of received light, each of the one or more signals being temporally resolved and representative of at least a part of the received light,
determine one or more time response values based on the one or more signals, and
optionally determine a difference measure indicative of a difference, such as an absolute or relative difference, in concentration between two or more predetermined analytes based on the one or more time response values.

According to an alternative third aspect, there is presented a computer program, such as a computer program product, comprising instructions to cause the apparatus according to the first aspect (or an apparatus according to the first aspect wherein the data processing device is further operatively connected to the one or more light sources and/or the detector) to execute the steps of the method of the second aspect.

According to a further aspect, there is presented a computer-readable medium having stored thereon the computer program of the third aspect and/or the computer program of the alternative third aspect. The first, second and third aspect of the present invention may each be combined with any of the other aspects. These and other aspects of the invention will be apparent from and elucidated with reference to the embodiments described hereinafter.

BRIEF DESCRIPTION OF THE FIGURES

The apparatus, method and computer program according to the invention will now be described in more detail with regard to the accompanying figures. The figures show one way of implementing the present invention and is not to be construed as being limiting to other possible embodiments falling within the scope of the attached claim set.

Preferred embodiments of the invention will be described in more detail in connection with the appended drawings, which show in FIG. 1 schematically, a porous unit device according to one embodiment, under operational conditions, FIG. 2 schematically, a porous unit contacted directly with the liquid;

FIG. 7 a top elevational view of the measurement cell of FIG. 6a;

DETAILED DISCLOSURE OF THE INVENTION

Figure 1:
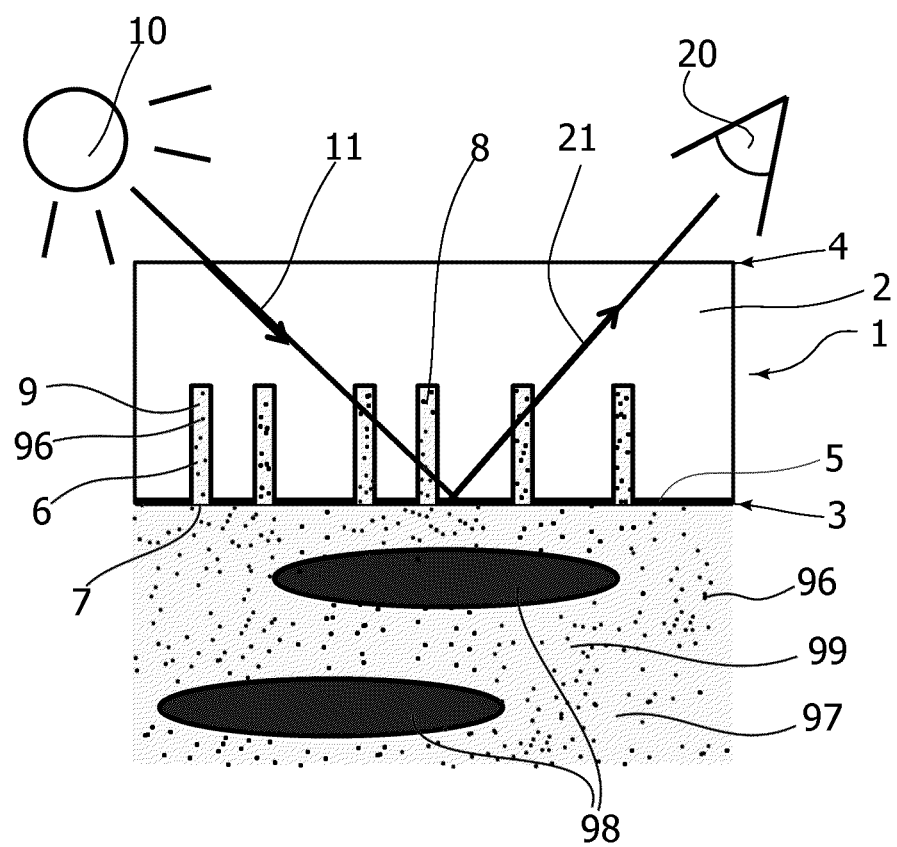

FIG. 1 shows schematically a cross-sectional view of a porous unit 1. The porous unit 1 comprises a translucent element 2, with a front side 3 and a back side 4. The front side 3 is provided with one or more layers 5 enabling internal reflection (in an alternative embodiment there would be no one or more layers and in yet another alternative embodiment, there would be one or more translucent layers and in yet another alternative embodiment, there would be one or more absorbing layers). The translucent element 2 further comprises dead end pores 6 extending from an opening 7 at the front side 3 through the one or more layers 5 into the bulk of the translucent element 2, where they terminate. While shown like that in the schematic drawing of FIG. 1, the pores do not have to be perpendicular to the front side 3 or parallel to each other. Under operation, the front side 3 of the porous unit with pore openings 7 is contacted with a liquid 99. The liquid may have a cellular fraction or particular fraction comprising red blood cells or particles 98, and a plasma fraction/liquid fraction 97 with relevant components to be detected, here the analyte 96. A cross-sectional dimension of the openings 7 of the pores 6 is dimensioned so as to prevent red blood cells or particles 98 from entering the pores 6, while allowing the analyte 96 to enter the pores 6.

The pores 6 may be pre-filled with a rinse solution 8 that is compatible with the liquid 99, and in particular with the liquid fraction 97. When the liquid 99 contacts the front side 3 of the porous unit 1 with the pre-filled pores 6, a diffusive transfer of the analyte 96 into the pores 6 occurs, thereby establishing a sub-sample 9 inside the pores 6 with a concentration of the analyte 96 that is representative of the concentration of the analyte 96 in the liquid 99.

The rinse solution 8 used for pre-filling the pores 6 may be any aqueous solution compatible with the liquid 99. Suitable rinse solutions include those commonly used for rinse, calibration, and/or quality control purposes in blood parameter analyzers. Such solution compositions typically include organic buffers, inorganic salts, surfactant, preservatives, anti-coagulant, enzyme, colorant and sometimes metabolites. Optical detection is performed from the backside using an optical probing arrangement with a light source 10 and a detector 20. The light source 10 illuminates a probing volume in the porous portion of the translucent element 2 from the side of the one or more layers 5 facing away from the liquid 99. The probing light 11 is an obliquely incident beam interacting with the sub-sample 9 in the pores 6. Emerging light 21 is detected by the detector 20 also arranged to view the probing region at an oblique angle. The detector 20 generates a signal representative of the emerging light, and in particular contains information on the concentration of the analyte 96, due to the interaction with the sub-sample 9 in the pores 6. Processing the generated signal allows developing a level of the analyte in the liquid. Using calibration, the level of the analyte in the liquid may be quantitative. The optical probing technique used for all measurements in the examples below uses spectrally resolved absorbance measurements in the visible range of the electromagnetic spectrum, e.g. with wavelengths in the range between about 380 nm and 750 nm, between about 400 nm and 520 nm, or at about 455 nm.

A measurement cycle is concluded by washing out the liquid with a rinse solution, such as the rinse solution 8 used for pre-filling the pores 6. Thereby, the sensor device is re-initialized and ready for receiving the next liquid.

Figure 2:
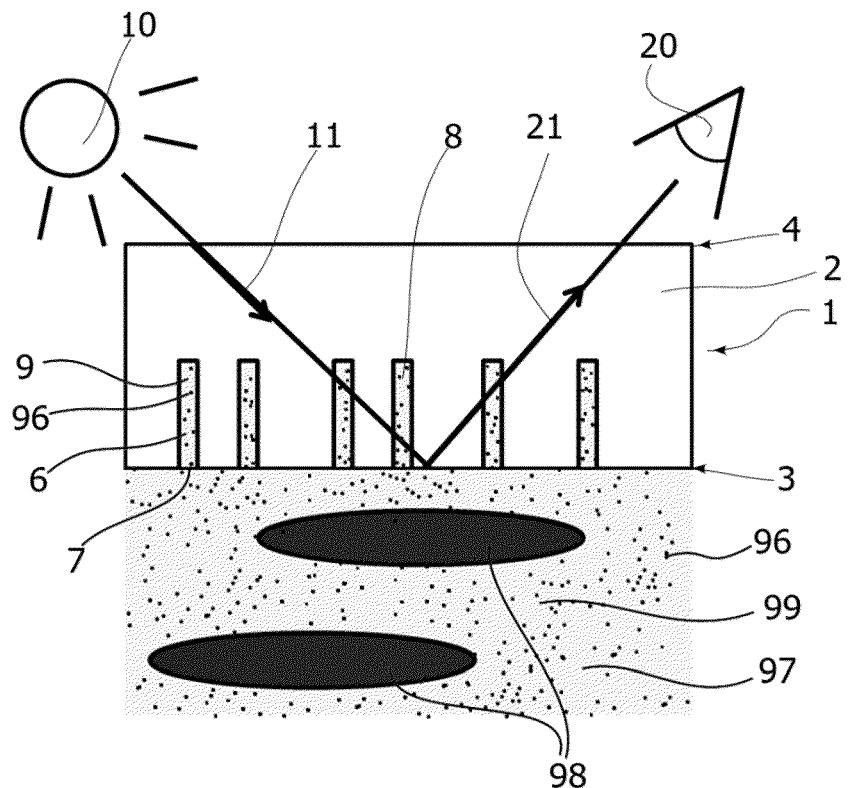

FIG. 2 shows a porous unit as in FIG. 1 except the porous unit is FIG. 2 does not comprise one or more layers, i.e., the translucent element is contacted directly with the liquid (no one or more layers being present at a front side of the translucent layer).

Figure 3:
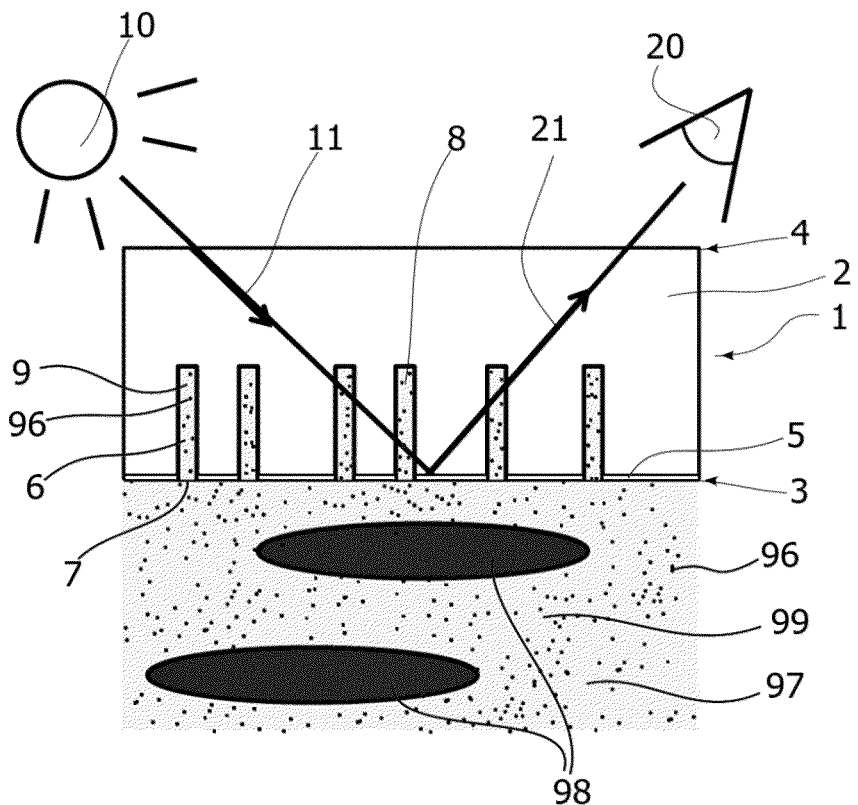
FIG. 3 schematically, a porous unit comprising a low index refraction layer.

FIG. 3 shows a porous unit comprising a low index refraction layer 5 (compared to the refractive index of the translucent element) which allow internal reflection, such as total internal reflection, at interface between the translucent element and the layer 5 of light reaching the interface from the translucent element.

Figure 4:
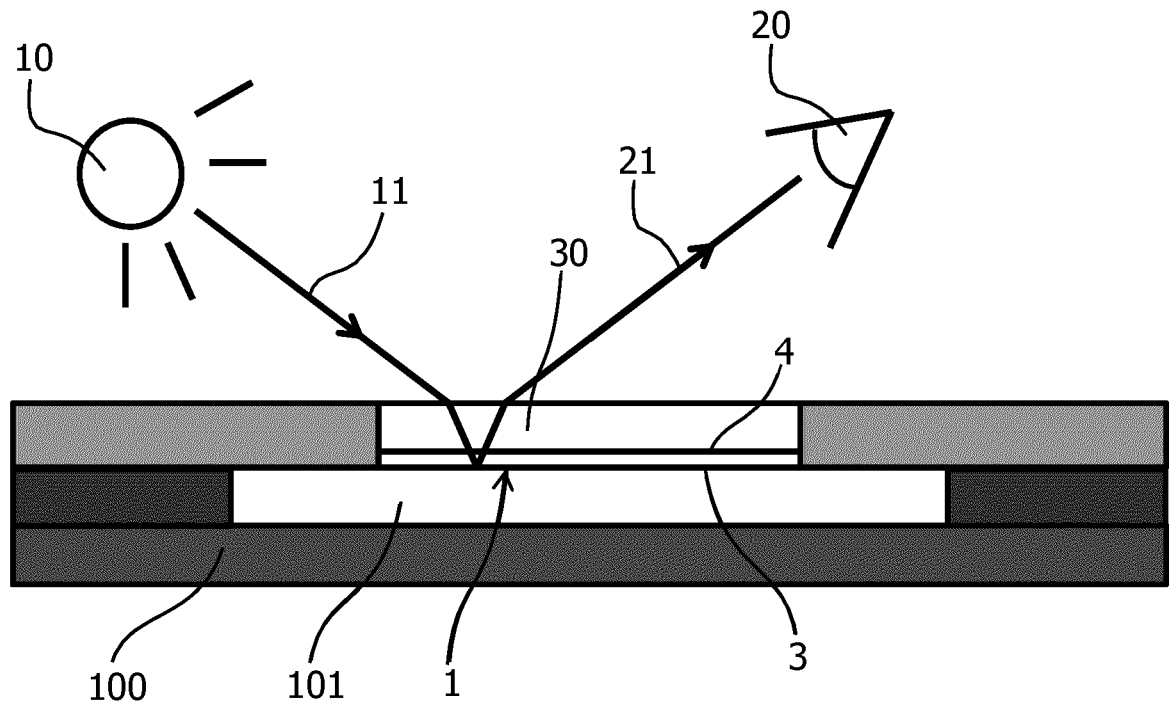
FIG. 4 schematically, a cross-sectional side view of a measurement cell.
Figure 5:
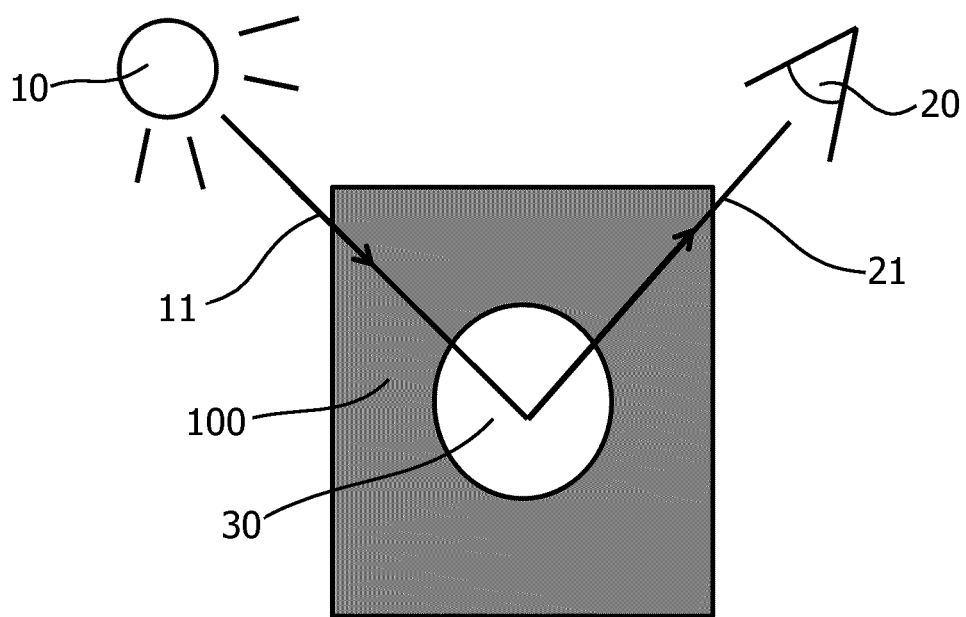
FIG. 5 a top elevational view of the measurement cell of FIG. 4.

FIG. 4 and FIG. 5 show schematically a measurement cell 100 comprising a porous unit 1 with its front side 3 facing into a liquid volume 101 inside the measurement cell 100, such as wherein the measurement cell 100 is a housing and wherein the liquid volume 101 is a sample space. The liquid volume communicates with liquid input and output ports (not shown) for feeding and discharging liquids and for performing priming, rinsing, and wash-out steps. The back side of the porous unit is mechanically stabilized by a transparent backing slide 30, which also acts as a window for optical access to the probing region from the back side 4 of the porous unit 1. Optical probing is performed using an arrangement with a light source 10 and a detector 20 as described above with reference to FIG. 1, wherein the probing beam and the direction of detection are inclined with respective angles to a surface normal on the plane of the front side 3 of the porous unit 1. Furthermore, as best seen in FIG. 5, the planes of incident probing light 11 and of detection 21 preferably intersect each other with an angle of less than 180 degrees to avoid glare effects, and preferably at a pointed angle of about 90 degrees or below. In the measurements of the examples given below, the planes of incident probing light 11 and of emerging light 21 are arranged symmetrically with respect to a direction parallel to the symmetry planes of the small mirror elements 52.

Figure 6A:
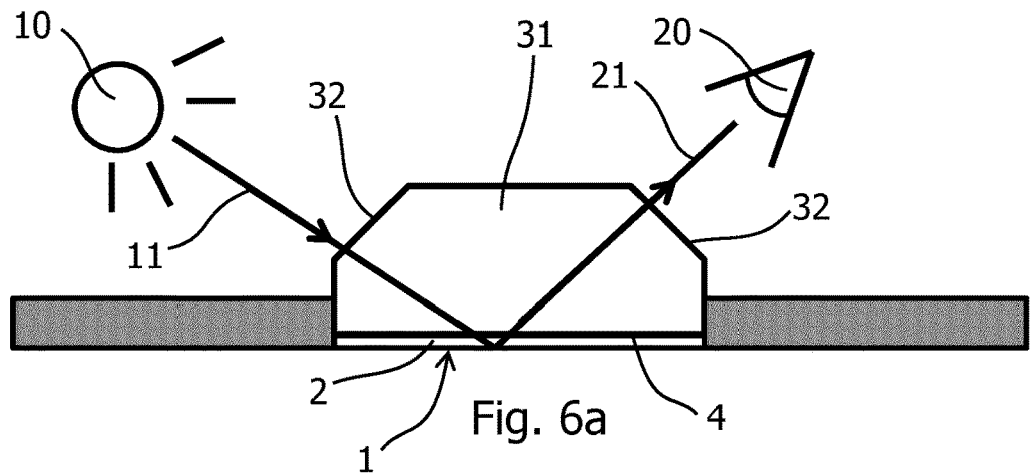
FIGS. 6a/b schematically, two cross-sectional side views of a measurement cell with prism-like outside of the transparent backing, according to a further embodiment.
Figure 6B:
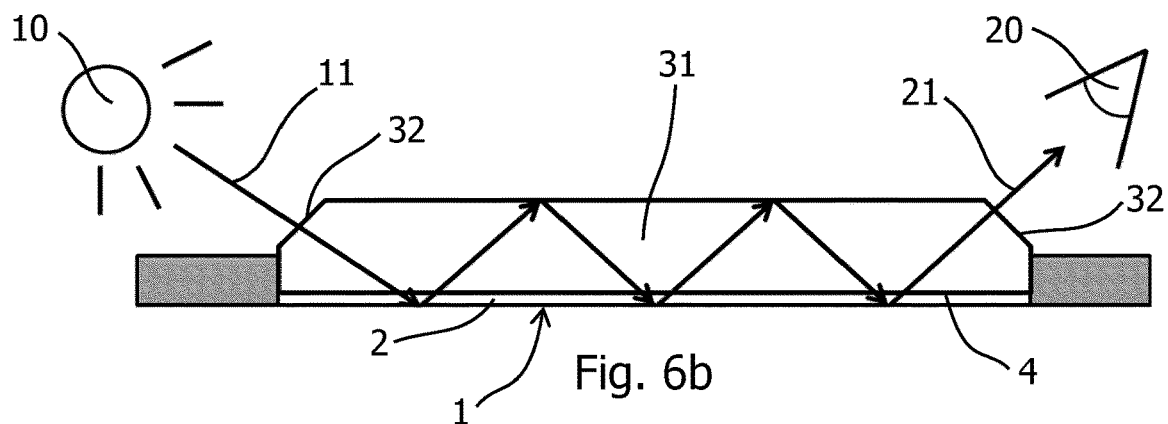
Figure 7:
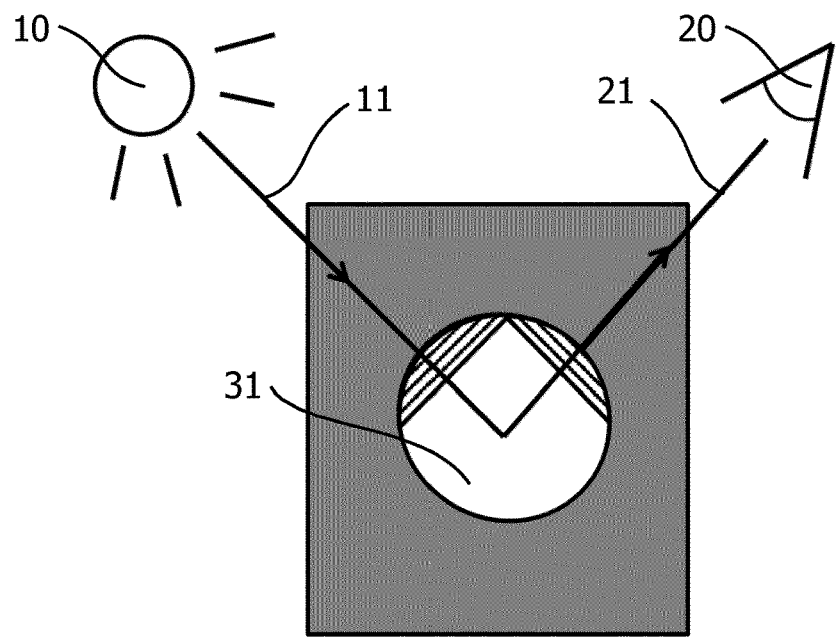

FIG. 6a, 6b and FIG. 7 show schematically a transparent backing slide 31 in direct contact with the back side 4 of the translucent element 2 of the porous unit 1. When incident probing light 11 enters the back slide 4 of the translucent element 2 with the surface at 60° prism 32, the shift in refractive index between air and polymer does not affect the incident probing light 11 and the light enter the pores 6 (not seen) of the translucent element 2 without change of the angle of the light and the emerging light 21 reaches the detector 20. FIG. 6b shows that the incident probing light 11 may be reflected several times in the transparent backing slide 31 before the emerging light 21 reaches the detector 20. Furthermore, as best seen in FIG. 7, the planes of incident probing light 11 and the emerging light 21 preferably intersect each other with an angle of less than 180 degrees to avoid glare effects, and preferably at a pointed angle of about 90 degrees or below and the prisms 32 does not affect the incident probing light 11, nor the emerging light 21.

In FIGS. 1, 4, 5, 6a, 6b and 7 the pores are probed optically from the back side 4 of the translucent element 2, i.e., incident probing light 11 to the pores 6 travels in a direction towards the front side 3 from the backside 4, i.e., entering the translucent element 2 via the backside 4 in a direction from the backside 4 to the front side 3 and light 21 emitted from the pores 6 to a receiving unit, such as a light detector 20, being emitted in a direction from the front side to the backside, i.e., from the back side in a direction away from the front side.

In FIGS. 1, 4, 5, 6a, 6b and 7 the incident and emitted light is depicted as propagating in air or empty space, but in embodiments, said incident and emitted light could be propagating in an optical assembly comprising a light guide core, the light guide core comprising an input branch, an output branch, and a coupling interface arranged to contact the backside 4 of the translucent element 2 opposite to the front side 3, such as wherein the input branch and the output branch are arranged in a common light guide plane arranged perpendicular to a front side surface.

EXAMPLES

Translucent Element with Reflective Palladium Layer—Steady-State Measurements

Referring to FIGS. 8-11 in the following, data from test run measurements are given as examples illustrating different aspects of the performance of a porous mirror, which corresponds to a porous unit comprising a reflective palladium layer at the front side of the translucent element (which in the examples is a slab), the reflective palladium layer being adapted to reflect light reaching the reflective palladium layer from the backside of the translucent element, wherein the data in FIGS. 8-11 from the porous mirror are presented as examples useful for understanding the porous unit according to embodiments of the invention.

The porous mirror used for the experiments of these examples were produced from a transparent PETP-membrane, with a total thickness 49 μm that is provided with single-sided track-etched, linear pores. The pores have a pore depth of 25 μm and a pore diameter of 0.4 μm with a hydrophilic PVP treatment. The areal pore density is 1.2E8/cm$^2$. The pores are thus dead end with an opening at one side of the PETP-membrane, ending essentially half way into the PETP-membrane acting as the translucent slab. The porous side of the membrane (translucent slab) is sputter coated with Palladium at an angle of 0 degrees and with an approximate layer thickness of 100 nm. This gives a metal coating on the porous front side of the membrane (translucent slab) and a small coating on one side of the inside of the pores thus forming small concave mirrors in a mouth portion of the pores adjacent to their opening towards the front side. The sputtered porous PETP-membrane is laminated to a custom build cuvette using a double sided adhesive tape so that the concave side of the small mirrors in the pores is pointing halfway between light guides from the light source and from a spectrometer input. A drop of approximately 10 µL of silicon rubber is pipetted onto the membrane and a cover glass is then fixed to the backside of the membrane as a mechanical backing of the sensor membrane (translucent slab). The porous mirror is mounted in a test bench for automatic handling of liquids, time intervals and data sampling. Data acquisition last approximately 3s and is delayed until 14s after liquid acquisition.

The test bench is equipped with two light emitting diodes (a purple and a 'white' LED) as light source, and with a mini-spectrometer as a detector. The standard slit in the mini-spectrometer has been replaced with a 125 µm slit in order to increase light and sensitivity. As the measurement is a reflection measurement, the light source and detector are both placed on the back side (none porous side) of the porous membrane. The porous metal coated side of the membrane is positioned on the inside of the measuring chamber and the mirror and the pores are thus directly exposed to the liquids in the chamber. Light from the two light diodes are led through a common fiber light guide, which has a lens at the end for collimating the light to a small spot of the porous mirror membrane (approximately 2 mm by 2 mm). Referring to a Cartesian coordinate °, the plane of the membrane (front side of the translucent slab) may be defined as the ZX-plane of the coordinate system. The light enters the membrane outer surface (back side of the translucent slab) at a 45° angle with respect to the Y-axis, i.e. the surface normal to the ZX-plane (and in the YZ-plane of the coordinate system). The detector is positioned with a polar angle of 60° with respect to the Y-axis, and turned with respect to the YZ-plane by an azimuthal angle of 90° with respect to the plane of incidence of the light source (e.g. in the YX-plane). The relatively high angles of light incidence and detection direction with respect to the Y-axis results in improved detection sensitivity for hemoglobin, since the collected light has traveled through a greater length of the sub-sample in the pores.

Liquids are prepared by spiking a whole blood sample with bilirubin. The interference solutions based on plasma are prepared by spiking the plasma with interferents to the specified values. Plasma is produced by centrifugation in 15 min. at 1500 G. As reference, the absorbance spectra of centrifugation derived plasma from all whole blood samples tested are also measured on a Perkin Elmer Lambda 19 UV-Vis spectrometer.

Figure 8:
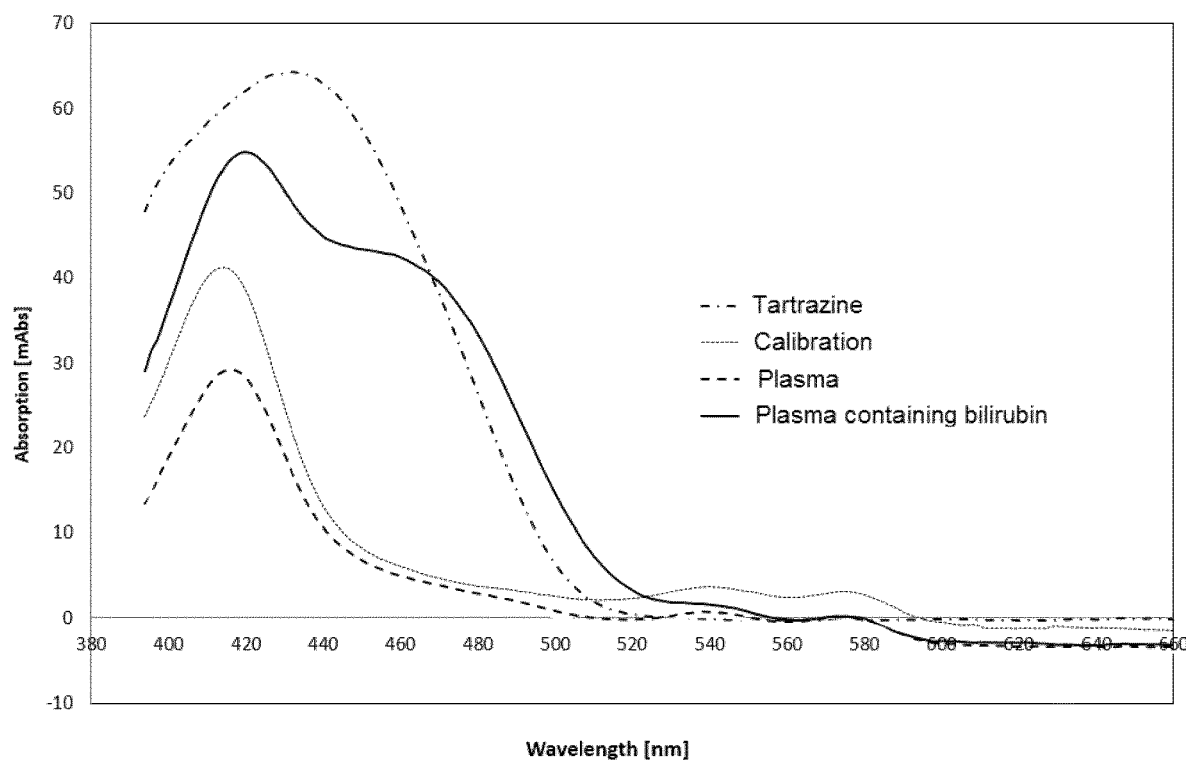
FIG. 8 a graph showing examples of response of bilirubin in plasma.

Spectral FIG. 8 shows spectrally resolved absorbance data for two liquids, one with plasma containing bilirubin and on with only plasma. At a wavelength of around 455 nm a pronounced peak is observed wherein the absorbance maximum for the different liquids evidently scales linearly according to their content in bilirubin.

Figure 9:
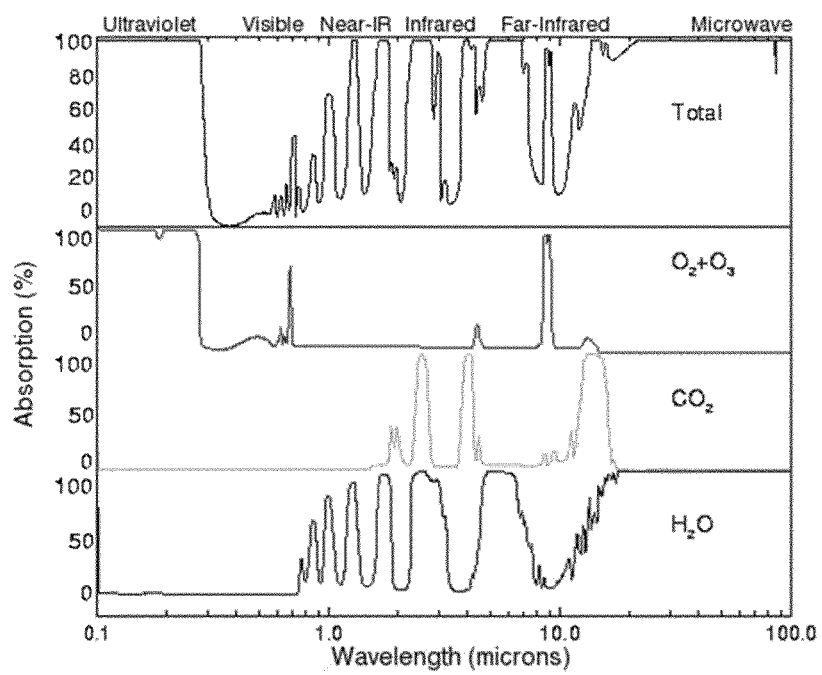
FIG. 9 a graph showing IR spectra of $CO_2$ and $H_2O$ (retrieved from http://www.randombio.com/co2.html on Nov. 8, 2016)

Spectral FIG. 9 shows spectrally resolved infra-red data of carbon dioxide ($CO_2$) and water ($H_2O$). The non-overlaying peaks from $CO_2$ compared to water indicates that the $CO_2$ content can be determined using a porous mirror of the invention in a $CO_2$ containing fluid, even if water is present in the fluid.

Figure 10:
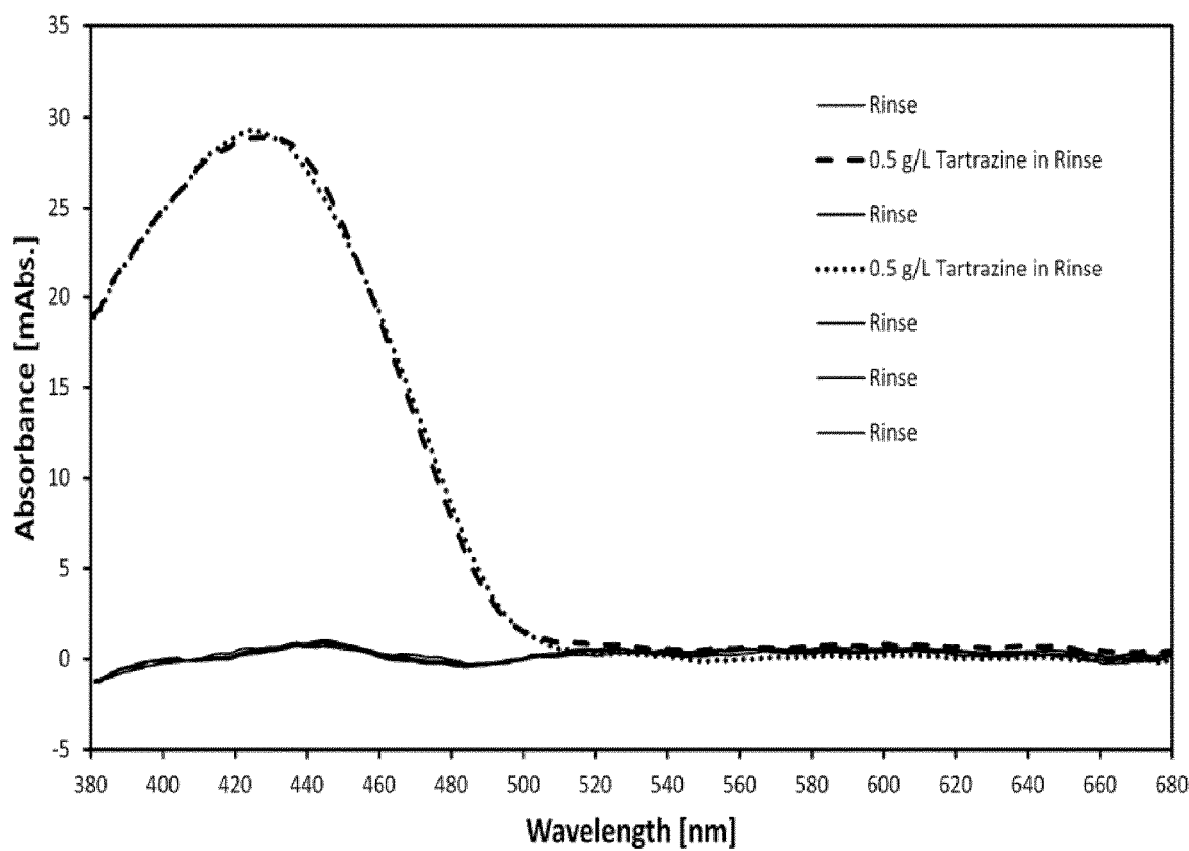
FIG. 10 a graph showing an example of using a dye (Tartrazine) as a calibration and quality control reference for spectrophotometric measurements.

Spectral FIG. 10 shows an example with a series of spectrally resolved absorbance data obtained on a dye-based calibration solution and, for comparison, on a rinse solution. The spectra where obtained in successive cycles immediately after each other. The dye-based calibration solution is a rinse solution with an addition of 0.5 g tartrazine per 1 L rinse. The sequence of measured solutions is as follows: First a rinse solution, then a dye-based calibration solution, then again a rinse solution, again the same dye-based solution and a sequence of three consecutive measurements all performed on rinse solution. All spectra are plotted on the same scale and on top of each other. The experiment shows again a very good stability and reproducibility of the obtained results. Yet more important, the data shows a surprisingly clear separation of the two dye-based solution spectra coinciding on top of each other, and all five rinse solution spectra also coinciding on top of each other. Note that the optical data are all probed in the probing volume of the porous mirror. This indicates a very efficient and complete diffusive exchange for extraction and washout of the sub-sample in the pores also when using a dye-based spectrophotometric calibration solution, such as the above-mentioned tartrazine dyed rinse solution.

Figure 11:
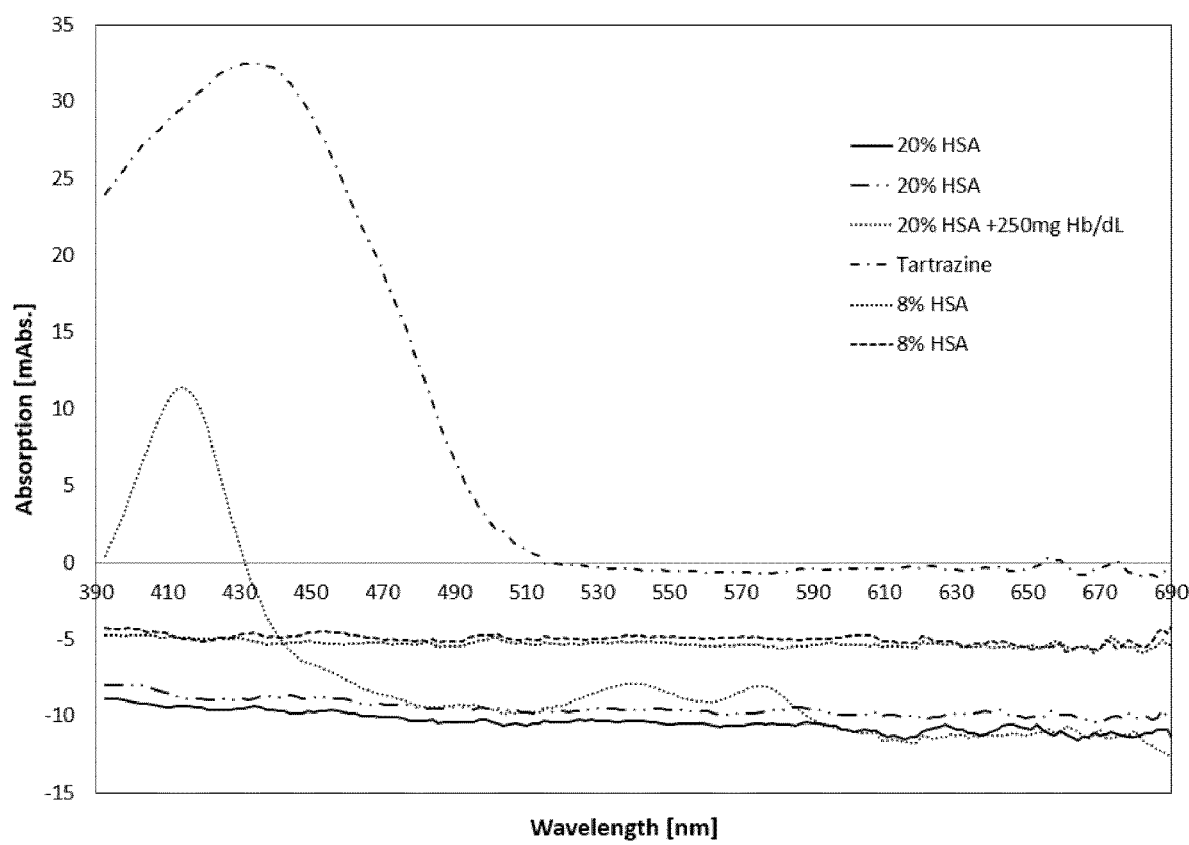
FIG. 11 a graph showing examples of response to different concentrations of protein (HSA) in human whole blood.

Spectral FIG. 11 shows spectrally resolved absorbance data of the negative baseline caused by the higher refractive index by the high protein content in plasma as compared to rinse. The porous mirror reflects a higher proportion of the incoming light towards the detector when measuring on whole blood or plasma than compared to rinse. The effect is seen at high wavelengths (600 to 700 nm) where hemoglobin in the whole blood does not absorb. The effect is about 5 mAbs, compared to the hemoglobin having about 10-15 mAbs at the hemoglobin peak wavelength (416 nm). It will be possible to detect the content of protein (HSA) of whole blood samples with a detection limit of about 1-5 g/L. Two different HSA concentrations (20% and 8%) are measured, the higher concentration is also measured with free (i.e. hemoglobin outside of red blood cells) in the liquid. The presence of hemoglobin in the liquid only affects the part of the spectra below 600 nm. Above 600 nm the HSA content is the main influence on the spectra, the more negative baseline the higher protein content in the whole blood sample.

While the device and method of the invention has been discussed specifically with reference to the detection of bilirubin, according to a broader aspect, the devices and methods discussed herein are equally applicable to the detection of other optically active substances in the plasma fraction of a whole blood sample or in a liquid, wherein "the term optically active" refers to substances, that can be detected directly by a spectroscopic optical probing technique. Such substances may include, but are not limited to metabolic substances, pharmaceutical substances, drugs, or vitamins.

Figure 12:
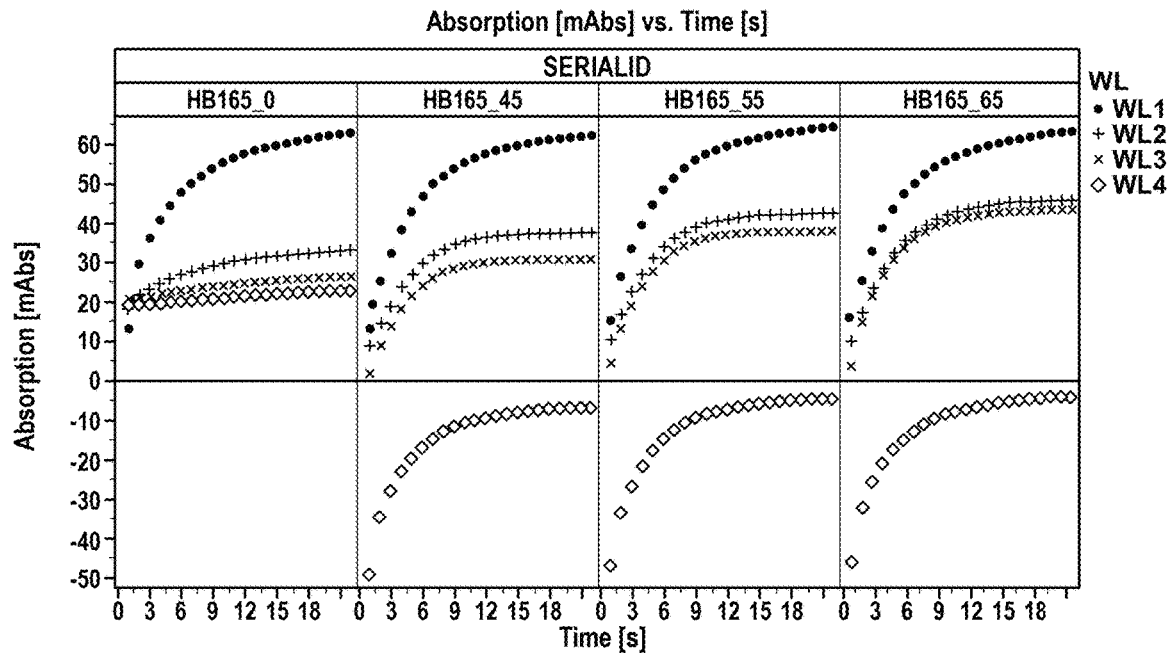
FIG. 12 graphs showing temporally resolved signals for a porous unit.

Translucent Element with no Layer(s)—Multiple, Time Resolved (Transient) Signals FIG. 12 shows optically detected (absorbance) signal for a setup being similar to the setup used for obtaining the data presented in FIGS. 8-11, and in particular where the porous unit being directly in contact with the liquid (i.e., no one or more layers present). All scales are linear. Horizontal axes show time in seconds. Vertical axes show optical (absorbance) signal. All curves show temporal development (diffusion), and the sub-graphs show data for, from left to right, liquids with hematocrit (Hct) levels of respectively 0, 45, 55 and 65%. In each sub-graph, four curves (or sets of markers effectively drawing up four curves) are shown, each corresponding to a different wavelength (although the same four wavelengths (WL1, WL2, WL3 and WL4) are employed in each sub-graph).

The porous unit and the setup is or could be similar to the porous mirror and setup described with reference to FIGS. 8-11, where changes with respect to that setup in particular include that there is no one or more layers at the front side of the porous unit (and in particular that there is no reflective, metallic, palladium layer), such as the porous unit being directly in contact with the liquid.

Time Response Values Enabling Distinguishing Hap-cfHb and cfHb

Haptoglobin (Hap) binds cell free hemoglobin (cfHb) and carries it to the liver where it is degraded and the iron (Fe) can be reused. Blood plasma contains on the average about 160 mg/dL Hap, and this can bind approximately 100 mg/dL cfHb. During in-vivo hemolysis Hap quickly becomes depleted, thus a determination of haptoglobin-bound cell free hemoglobin (Hap-cfHb) can potentially be used to determine whether hemolysis occurred in-vivo or in-vitro. This example documents the possibility of quantifying Hap-cfHb using time response values as obtained with an embodiment of the present invention.

CONCLUSION

Haptoglobin determination is particularly relevant in samples above the insignificant hemolysis interval (100 to 165 mg/dL cfHb).

For highly hemolysed samples (cfHb>330 mg/dL) a possible correction (of values affected, such as by interference due to cfHb) will be less precise. Thus Hap presence might only need to be identified in the hemolysis interval of 100 to 330 mg/dL.

Presence of Haptoglobin in a hemolyzed sample can be identified in the important hemolysis interval by an increase in the ratio of a characteristic ('tau'-)time at a first wavelength, tau_WL1 relative to a characteristic ('tau'-)time at a second wavelength, tau WL4, where 'tau' is determined as the characteristic time in a first-order, time-invariant system as previously described.

The tau_WL1/tau_WL4 tau increase is brought about by Hap binding cfHb and thus increasing the average MW and tau of diffusion. The WL4 signal is utilized as an internal tau reference in the sample.

The result is groundbreaking because it demonstrates the ability of the apparatus with the translucent element according to the invention to distinguish between two compounds with identical optical properties (at least for said apparatus) but with a difference in molecular weight (MW). This is not possible on a normal spectrophotometer.

Hap can be detected particularly well in samples at or around 165 mg/dl cfHb.

Data

When cfHb is bound to Hap the complex's MW increases. The apparatus determines the time constant for the signal buildup and enables determining whether Hap is present in the sample. In order to obtain a value insensitive to interferences, tau (which is understood to be the characteristic time) of the cfHb signal on WL1 (which is understood to be the first wavelength, which is 415 nm) can be compared to the tau of the plasma signal (WL4 (which is understood to be the second wavelength, which is 450 nm)). The average plasma protein content does not have a color, however the higher refractive index (RI) of plasma causes a signal on all wavelenghts (WLs), at WL4 no Hb absorption is present. A determination of tau_ratio (tau_ratio=100*((tau_WL1−tau_WL4)/tau_WL4) can thus elucidate whether the sample contains Hap.

Figure 13:
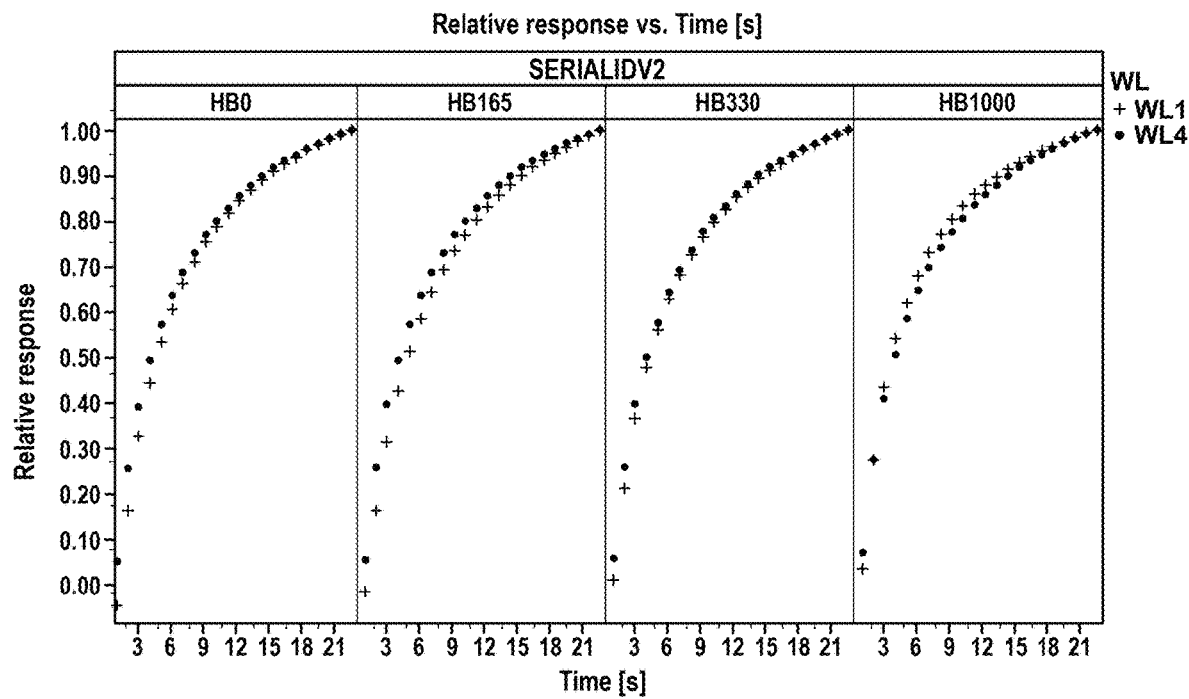
FIG. 13 multiple temporally resolved signals at wavelengths WL1 and WL4 at four different concentrations of cfHb.

FIG. 13 shows multiple temporally resolved (normalized) signals at wavelengths WL1 and WL4 at four different concentrations of cfHb. The figure shows that at concentrations of 0 and 330 mg/dL, the characteristic tau-times are roughly similar, but at 165 mg/dL WL1 is slower than WL4 and opposite at 1000 mg/dL. As mentioned previously average serum Hap is able to complex about 100 mg cfHb, thus tau_ratio is expected to be rather unaffected at ccfHb=1000 mg/dL (with ccfHb being an abbreviation of concentration, c, of cell-free, cf, hemoglobin, Hb). Similarly at ccfHb 0 mg/dL no cfHb is present, and tau_WL1 is determined by the same proteins that constitute the WL4 signal thus the tau_ratio is expected to be close to zero.

Figure 14:
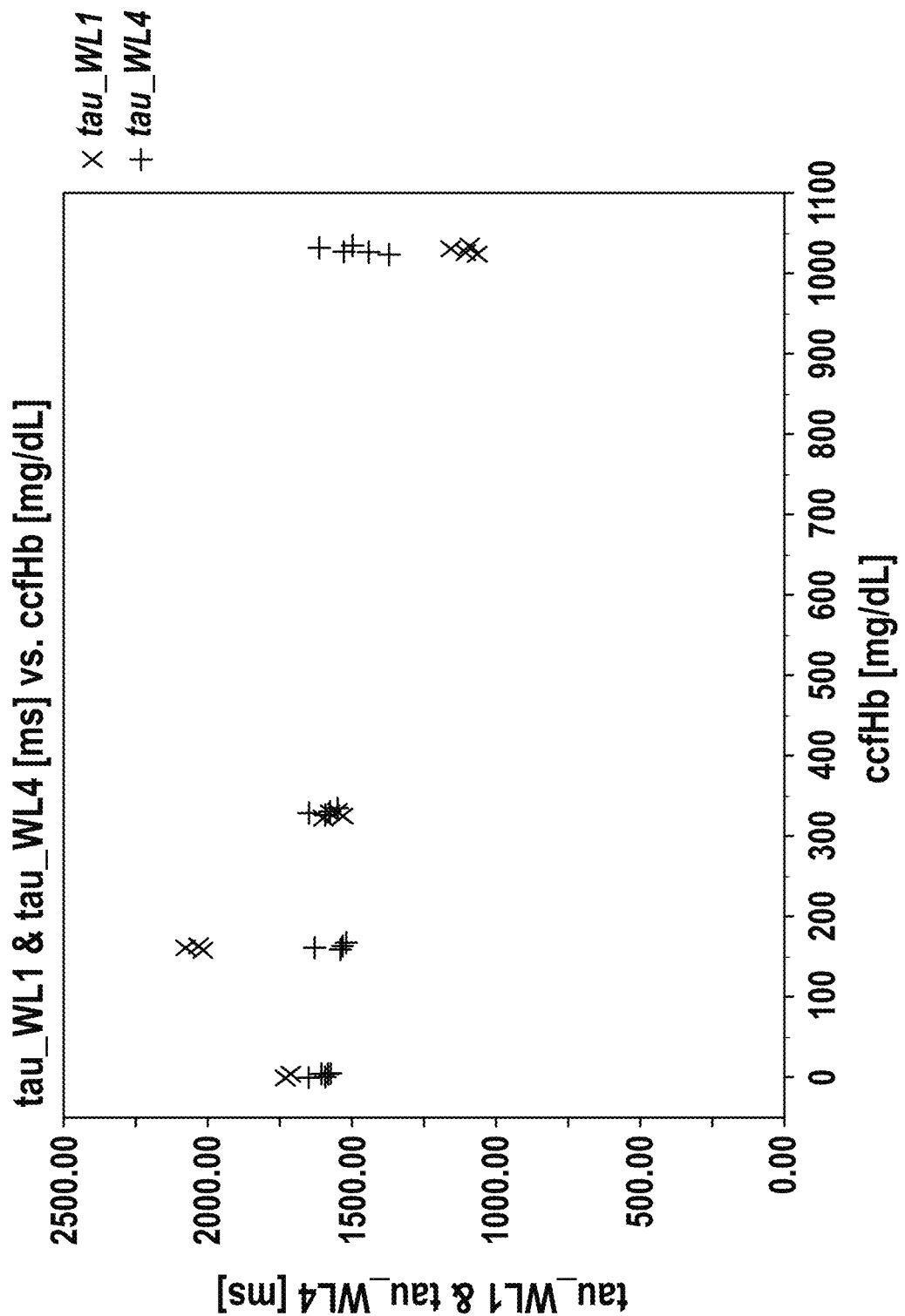
FIG. 14 characteristic tau-times as derived from the data of FIG. 13.

FIG. 14 shows characteristic tau-times as derived from the data of FIG. 13.

Figure 15:
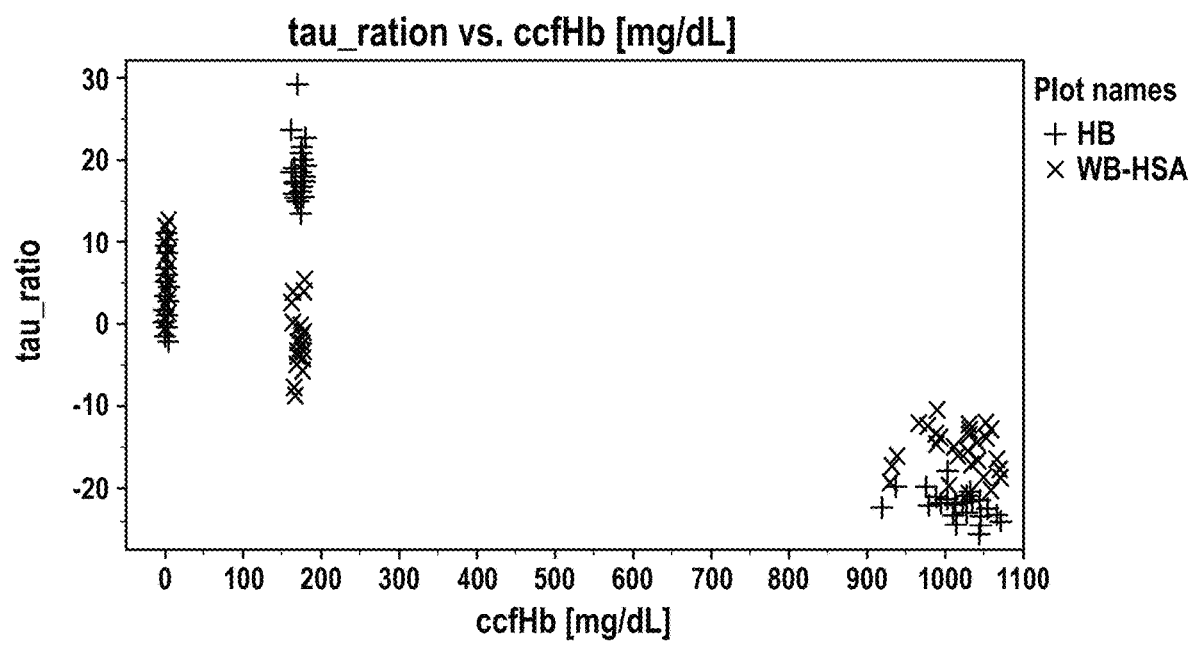
FIGS. 15-16 tau_ratio and tau_WL1 as a function of cfHb.

FIG. 15 shows tau_ratio (tau_WL1/tau_WL4) and tau_WL1 as a function of ccfHb. Samples are either hemolysed blood (HB) or blood samples where plasma is substituted by 8% HSA in order to obtain a sample without Hap (WB-HSA). All samples contain a hematocrit (Hct.) value of 45%.

As can be observed in FIG. 15 the HB samples show a higher tau_ratio at ccfHb=165 mg/dL as compared to 0 and 1000 mg/dL.

Figure 16:
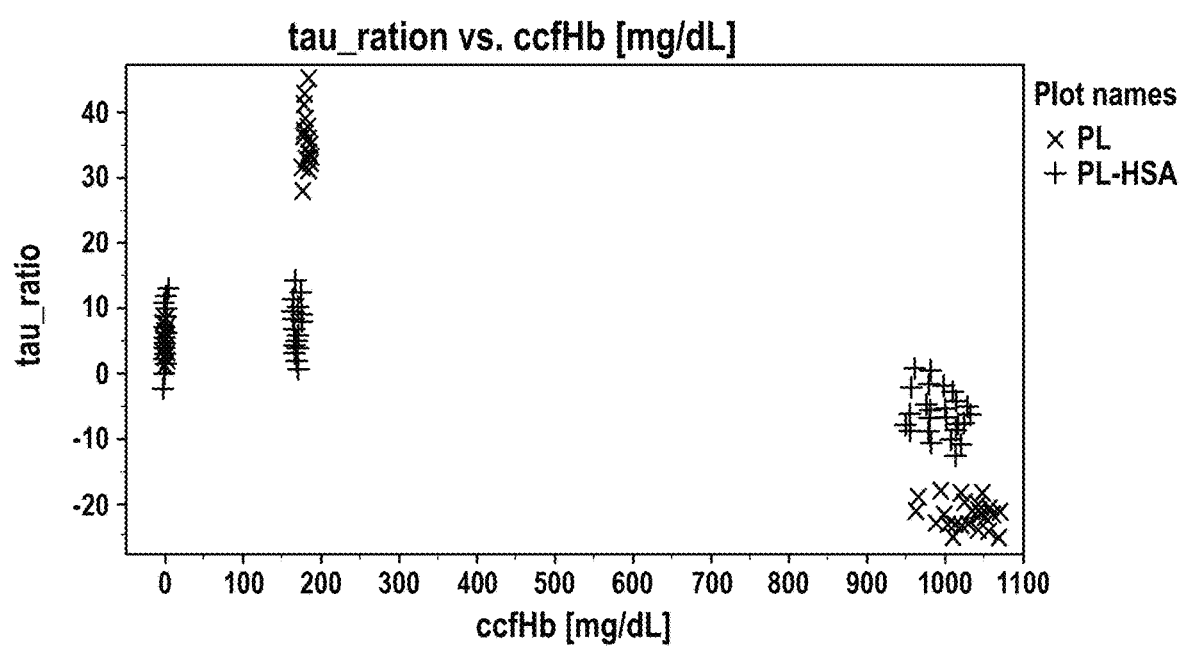

FIG. 16 shows tau_ratio (tau_WL1/tau_WL4) and tau_WL1 as a function of ccfHb. Samples are either hemolysed plasma (PL) or 8% HSA (in order to obtain a sample without Hap) (PL-HSA). Both sample types are without red blood cells.

As can be observed in FIG. 16 the PL samples show a higher tau_ratio at ccfHb=165 mg/dL as compared to 0 and 1000 mg/dL.

FIGS. 15-16 show that the tau-ratio is rather insensitive toward Hct.

Furthermore, FIGS. 14-16 show that a difference measure indicative of a difference, such as an absolute or relative difference, in concentration between two or more predetermined analytes in the liquid can be provided based on the one or more time response values. For example, based on the tau-ratio tau_WL1/tau_WL4 or, e.g., tau_WL1 alone, it is possible to estimate or determine (at least for certain relevant concentrations of cfHb) the difference measure on a binary scale (a ratio concentration$_{Hap-cfHb}$/concentration$_{cfHb}$ between a Hap-cfHb concentration and a concentration of Hap-unbound cfHp exceeds a certain threshold, which results in, e.g., the tau_WL1/tau_WL4 ratio (significantly and measurably) exceeding a threshold). By a quantitative calibration of, e.g., values of tau_WL1/tau_WL4 vs. values of ratios concentration$_{Hap-cfHb}$/concentration$_{cfHb}$ it will be possible to obtain quantitative, relative values of ratios concentration$_{Hap-cfHb}$/concentration$_{cfHb}$ from measured values of ratios tau_WL1/tau_WL4. Furthermore, by measuring an absolute concentration of, e.g., the sum of Hap-cfHb and Hap-unbound cfHp (concentration$_{Hap-cfHb}$+concentration$_{cfHb}$) it will be possible to determine the concentrations of each of Hap-cfHb and Hap-unbound cfHp as well as an absolute difference (measure).

Although the present invention has been described in connection with the specified embodiments, it should not be construed as being in any way limited to the presented examples. The scope of the present invention is set out by the accompanying claim set. In the context of the claims, the terms "comprising" or "comprises" do not exclude other possible elements or steps. Also, the mentioning of references such as "a" or "an" etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. An apparatus for determining one or more time response values of an analyte or a group of analytes in a liquid comprising:
    (a) a translucent element comprising pores, wherein the pores are dead end pores extending into the translucent element from respective openings in the translucent element, wherein a cross-sectional dimension of the openings of the pores is dimensioned so as to prevent larger particles or debris from entering the pores, while allowing the analyte or the group of analytes in the liquid to enter the pores via diffusion,
    (b) one or more light sources being adapted to transmit light through the translucent element and thereby illuminate at least the pores in the translucent element,
    (c) a light detector being adapted to at each of multiple points in time receive light emerging from the pores in response to illumination by the one or more light sources, wherein the light detector is further adapted to generate one or more signals based on the received light, each of the one or more signals being temporally resolved and representative of at least a part of the received light, and
    (d) a data processing device comprising a processor configured to determine one or more time response values based on the one or more signals,
        wherein the data processing device is further configured to determine a concentration of the analyte or the group of analytes in the liquid based on the one or more signals, and
        wherein the data processing device is further configured to determine if a concentration of the analyte or the group of analytes in the liquid is above a first predetermined concentration value and/or is below a second predetermined concentration value.

2. An apparatus according to claim 1, wherein the one or more light sources and/or the light detector are operatively coupled to the data processing device comprising a processor, and wherein the data processing device comprising a processor is further arranged to obtain a plurality of signals for different wavelength intervals, and
    determine a plurality of time response values by determining for each of the signals within the plurality of signals a time response value.

3. An apparatus according to claim 2, wherein the data processing device is further configured to determine an adjusted time response value, wherein the adjusted time response value is determined based on at least two time response values within the plurality of time response values.

4. An apparatus according to claim 1, wherein the one or more light sources and/or the light detector is arranged for obtaining a plurality of signals for different wavelength intervals.

5. An apparatus according to claim 1, wherein the data processing device is further configured to determine an adjusted time response value, wherein the adjusted time response value is determined based on at least two time response values.

6. An apparatus according to claim 1, wherein the data processing device is further configured to determine a ratio between a time response value obtained for a first wavelength interval and a time response value obtained for a second wavelength interval.

7. An apparatus according to claim 1, wherein the one or more light sources and/or the light detector are operatively coupled to the data processing device comprising a processor, and wherein the data processing device comprising a processor is further arranged to obtain a first signal at a first wavelength interval, obtain a second signal at a second wavelength interval, wherein the second wavelength interval is different from the first wavelength interval, and determine a ratio between:
    a first time response value obtained for the first wavelength interval, and
    a second time response value obtained for the second wavelength interval.

8. An apparatus according to claim 1, wherein the one or more time response values are based on one or more differences in signal values within each of the one or more signals where said signal values are obtained at different points in time, and/or is one or more characteristic times.

9. An apparatus according to claim 1, wherein the determined concentration of the analyte or the group of analytes in the liquid is based on the one or more time response values.

10. An apparatus according to claim 1, wherein the data processing device is arranged to detect the analyte or the group of analytes.

11. An apparatus according to claim 1, wherein the data processing device is further arranged to determine a difference measure indicative of a difference.

12. An apparatus according to claim 1, wherein the translucent element comprises material, which has an attenuation coefficient so that an, optionally partially or wholly diffuse, transmission coefficient of light through the material is at least 50% for a length through the material of 100 micrometers.

13. An apparatus according to claim 1, further comprising an optical assembly comprising a light guide core, the light guide core comprising an input branch, an output branch, and a coupling interface arranged to contact a back side of the translucent element opposite to a front side.

14. An apparatus according to claim 1, further comprising a housing penetrated by a flow channel defining an axial direction, the flow channel comprising a sample space and being arranged so that the pores on a front side define a sensor surface for contacting the liquid.

15. An apparatus according to claim 1, wherein the apparatus is arranged for optically probing the liquid disposed inside the pores from a front side facing a back side.

16. An apparatus according to claim 1, wherein
    the one or more light sources is adapted to illuminate at least the pores in the translucent element, from a front side towards a back side, and
    the detector is arranged to receive light emerging from the pores, and wherein the light detector is adapted to generate a signal representative of the received light, which has been emitted from the pores in a direction away from the front side in a direction facing the back side.

17. An apparatus according to claim 1, wherein the one or more light sources is adapted to illuminate at least the pores in the translucent element, wherein light from the one or more light sources reaching the pores need not have traversed a volume being fluidically connected with the pores and being outside of the translucent element, and the light detector is arranged to receive light emerging from the pores, and wherein the light detector is adapted to generate a signal representative of the received light, wherein light emitted from the pores and reaching the light detector need not have traversed a volume being fluidically connected with the pores and being outside of the translucent element.

18. An apparatus according to claim 1, wherein the apparatus is configured for measuring absorbance.

19. A method for determining one or more time response values of an analyte or a group of analytes in a liquid comprising
providing an apparatus according to claim 1,
contacting the pores of the apparatus with the liquid,
illuminating with the one or more light sources at least the pores through the translucent element,
at each of multiple points in time receiving light emerging from the pores in response to the illumination,
generating one or more signals based on the received light, each of the one or more signals being temporally resolved and representative of at least a part of the received light, and
determining one or more time response values based on the one or more signals.

20. The method according to claim 19, wherein the analyte is bilirubin, or Human Serum Albumin bound bilirubin,
wherein the group of analytes is a group comprising bilirubin, and/or Human Serum Albumin bound bilirubin,
the analyte is cell-free hemoglobin not bound to haptoglobin and haptoglobin bound hemoglobin, or
wherein the group of analytes is a group comprising cell-free hemoglobin not bound to haptoglobin and haptoglobin bound hemoglobin.

21. The method according to claim 19, wherein the method further comprises determining a difference measure indicative of a difference in concentration between two or more predetermined analytes in the liquid based on the one or more time response values.

22. The method according to claim 21, wherein the two or more predetermined analytes are Human Serum Albumin bound bilirubin and bilirubin not bound to human serum albumin, or cell-free hemoglobin not bound to haptoglobin and haptoglobin bound hemoglobin.

23. A computer program product comprising instructions which, when is executed by a computer, cause the computer to cause the apparatus according to claim 1 to execute a method for determining one or more time response values of an analyte or a group of analytes in a liquid comprising:
contacting the pores of the apparatus with the liquid,
illuminating with the one or more light sources at least the pores in the translucent element,
at each of multiple points in time receiving light emerging from the pores in response to the illumination,
generating one or more signals based on the received light, each of the one or more signals being temporally resolved and representative of at least a part of the received light, and
performing at least one of the steps of:
determining one or more time response values based on the one or more signals, or
causing the computer to:
(i) receive the one or more signals based of received light, each of the one or more signals being temporally resolved and representative of at least a part of the received light, and
(ii) determine one or more time response values based on the one or more signals.

24. An apparatus for determining one or more time response values of an analyte or a group of analytes in a liquid comprising:
(a) a translucent element comprising pores, wherein the pores are dead end pores extending into the translucent element from respective openings in the translucent element, wherein a cross-sectional dimension of the openings of the pores is dimensioned so as to prevent larger particles or debris from entering the pores, while allowing the analyte or the group of analytes in the liquid to enter the pores via diffusion,
(b) one or more light sources being adapted to illuminate at least the pores in the translucent element,
(c) a light detector being adapted to at each of multiple points in time receive light emerging from the pores in response to illumination by the one or more light sources, wherein the light detector is further adapted to generate one or more signals based on the received light, each of the one or more signals being temporally resolved and representative of at least a part of the received light, and
(d) a data processing device comprising a processor configured to determine one or more time response values based on the one or more signals, wherein the data processing device is further configured to determine a ratio between a time response value obtained for a first wavelength interval and a time response value obtained for a second wavelength interval.

25. An apparatus for determining one or more time response values of an analyte or a group of analytes in a liquid comprising:
(a) a translucent element comprising pores, wherein the pores are dead end pores extending into the translucent element from respective openings in the translucent element, wherein a cross-sectional dimension of the openings of the pores is dimensioned so as to prevent larger particles or debris from entering the pores, while allowing the analyte or the group of analytes in the liquid to enter the pores via diffusion,
(b) one or more light sources being adapted to illuminate at least the pores in the translucent element,
(c) a light detector being adapted to at each of multiple points in time receive light emerging from the pores in response to illumination by the one or more light sources, wherein the light detector is further adapted to generate one or more signals based on the received light, each of the one or more signals being temporally resolved and representative of at least a part of the received light, and
(d) a data processing device comprising a processor configured to determine one or more time response values based on the one or more signals;

wherein the apparatus is configured for measuring absorbance.

\* \* \* \* \*